(12) United States Patent
Tseng et al.

(10) Patent No.: US 8,103,614 B2
(45) Date of Patent: Jan. 24, 2012

(54) DEFINITION AND UTILIZATION OF RELATIONAL TAGS

(75) Inventors: Walter M. Tseng, Seattle, WA (US); Martin R. Frank, Bainbridge Island, WA (US); Michel L. Goldstein, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 860 days.

(21) Appl. No.: 11/537,446

(22) Filed: Sep. 29, 2006

(65) Prior Publication Data

US 2007/0208679 A1 Sep. 6, 2007

Related U.S. Application Data

(63) Continuation-in-part of application No. 11/276,539, filed on Mar. 3, 2006.

(51) Int. Cl.
*G06F 15/00* (2006.01)

(52) U.S. Cl. ........................................................ 706/62

(58) Field of Classification Search .................... 706/12, 706/62; 707/100
See application file for complete search history.

(56) References Cited

U.S. PATENT DOCUMENTS

| | | | |
|---|---|---|---|
| 5,740,425 A | 4/1998 | Povilus | |
| 6,041,311 A | 3/2000 | Chislenko et al. | |
| 7,100,199 B2 | 8/2006 | Ginter et al. | |
| 7,117,262 B2 | 10/2006 | Bai et al. | |
| 7,197,475 B1 | 3/2007 | Lorenzen et al. | |
| 7,668,821 B1 | 2/2010 | Donsbach et al. | |
| 2001/0047297 A1 | 11/2001 | Wen | |
| 2002/0007309 A1 | 1/2002 | Reynar | |
| 2002/0013792 A1 | 1/2002 | Imielinski et al. | |
| 2002/0024532 A1 | 2/2002 | Fables et al. | |
| 2002/0059272 A1 | 5/2002 | Porter | |
| 2002/0076674 A1 | 6/2002 | Kaplan | |
| 2002/0111146 A1 | 8/2002 | Fridman et al. | |
| 2002/0120504 A1 | 8/2002 | Gould et al. | |
| 2002/0147625 A1 | 10/2002 | Kolke, Jr. | |
| 2002/0173972 A1 | 11/2002 | Daniel et al. | |
| 2002/0174059 A1 | 11/2002 | Guo | |
| 2002/0198933 A1 | 12/2002 | Kwak | |

(Continued)

FOREIGN PATENT DOCUMENTS

WO WO03019418 A1 3/2003

OTHER PUBLICATIONS

Guan et al ("Intelligent product brokering for e-commerce: an incremental approach to unaccounted attribute detection" 2003.*

(Continued)

*Primary Examiner* — Jeffrey A Gaffin
*Assistant Examiner* — Lut Wong
(74) *Attorney, Agent, or Firm* — Lees & Hayes, PLLC

(57) ABSTRACT

A system is described which allows a user to define a relational tag. The relational tag describes how a first item is related to a second item within an identified qualifying context. For instance, the relational tag may state that the first item is ranked higher than or lower than the second item. When utilized by many users, the system forms a graph of interconnected items. The system can perform comparative analysis within this graph. For instance, based on the relational tags, the system can determine which item is the top-ranking item or bottom-ranking item within the graph.

33 Claims, 14 Drawing Sheets

U.S. PATENT DOCUMENTS

| | | | |
|---|---|---|---|
| 2003/0041108 | A1 | 2/2003 | Henrick et al. |
| 2003/0055725 | A1 | 3/2003 | Lee |
| 2003/0056222 | A1 | 3/2003 | Iwata et al. |
| 2003/0182310 | A1 | 9/2003 | Charnock et al. |
| 2004/0193506 | A1 | 9/2004 | Zmolek |
| 2005/0055306 | A1 | 3/2005 | Miller et al. |
| 2005/0065856 | A1 | 3/2005 | Roberts et al. |
| 2005/0114789 | A1 | 5/2005 | Chang et al. |
| 2005/0193010 | A1 | 9/2005 | DeShan et al. |
| 2005/0203807 | A1 | 9/2005 | Bezos et al. |
| 2005/0210392 | A1 | 9/2005 | Koide et al. |
| 2005/0251384 | A1 | 11/2005 | Yang |
| 2005/0256787 | A1 | 11/2005 | Wadawadigi et al. |
| 2006/0031263 | A1 | 2/2006 | Arrouye et al. |
| 2006/0041548 | A1 | 2/2006 | Parsons et al. |
| 2006/0041553 | A1 | 2/2006 | Paczkowski et al. |
| 2006/0190355 | A1 | 8/2006 | Jammes et al. |
| 2006/0282304 | A1 | 12/2006 | Bedard et al. |
| 2007/0033092 | A1 | 2/2007 | Iams |
| 2007/0043742 | A1 | 2/2007 | Arguello et al. |
| 2007/0078832 | A1 | 4/2007 | Ott, IV et al. |
| 2007/0168179 | A1 | 7/2007 | Markanthony et al. |
| 2007/0174247 | A1 | 7/2007 | Xu et al. |
| 2007/0226077 | A1 | 9/2007 | Frank et al. |
| 2007/0244756 | A1 | 10/2007 | Stucki |
| 2008/0082416 | A1 | 4/2008 | Kotas et al. |
| 2008/0091548 | A1 | 4/2008 | Kotas et al. |
| 2008/0114644 | A1 | 5/2008 | Frank et al. |
| 2010/0153364 | A1 | 6/2010 | Kirby |

OTHER PUBLICATIONS

Linden et al ("Amazon.com Recommendations" item-to-item collaborative filtering Feb. 2003).*

Kai et al ("Groups in Social Software: Utilizing Tagging to integrate individual contexts for social navigation" Aug. 2005).*

U.S. Appl. No. 11/615,851, filed Dec. 22, 2006, Paul A. Kotas and Joseph C. Park, "Community-Based Selection of Online Advertisements".

Battelle, John "Base.Google.com (Or..All Your Base Are Belong to Google)", retrieved on Nov. 3, 2005 at <<http://battellemedia.com/archives/001960.php>>, 8 pgs.

"Google Base—Google Search", retrieved on Nov. 3, 2005 at <<http://www.google.com/search?q=Google+Base>>, 2 pgs.

"Google Base on Flickr—Photo Sharing!", retrieved on Nov. 3, 2005 at <<http://www.flickr.com/photos/dirson/55908013>>, 5 pgs.

"Google Base Was Sort of Live", retrieved on Mar. 1, 2006 at <<http://blog.outer-court.com/archive/2005-10-25-n57.html>>, 2 pgs.

Hof, Robert et al., "Big Waves from 'Google Base'", retrieved on Mar. 1, 2006 at <<http://www.businessweek.com/technology/contect/oct2005/tc20051027_587849>>, 4 pgs.

Stewart, "The ABC's of Co-Ops", Apr. 2004.

Etsy, "Etsy: Your place to buy and sell all things handmade" retrieved on May 4, 2010 at <<http://www.etsy.com/>> 8 pages.

Roy, et al., "Collaborative Product Conceptualization Tool Using Web Technology", Computers in Industry 41, 2000, pp. 195-209.

Non-Final Office Action for U.S. Appl. No. 11/537,218, mailed on May 11, 2011, Martin R. Frank, "Convergence of Terms Within a Collaborative Tagging Environment".

Non-Final Office Action for U.S. Appl. No. 11/276,539, mailed on Jul. 8, 2011, Martin R. Frank, "Collaborative Structured Tagging for Item Encyclopedias ".

Chinese Office Action mailed Oct. 28, 2011 for Chinese patent application No. 200780007501.0, a counterpart foreign application of U.S. Appl. No. 11/276,539, 9 pages.

Chinese Office Action mailed Sep. 7, 2011 for Chinese patent application No. 200780007486.X, a counterpart foreign application of U.S. Appl. No. 11/537,446, 9 pages.

Final Office Action for U.S. Appl. No. 11/537,218, mailed on Oct. 20, 2011, Martin R. Frank, "Convergence of Terms Within a Collaborative Tagging Environment", 38 pages.

* cited by examiner

DEFINITION AND UTILIZATION OF RELATIONAL TAGS

CROSS REFERENCE TO RELATED APPLICATIONS

This application is a continuation-in-part of U.S. Ser. No. 11/276,539 (the '539 application), filed on Mar. 3, 2006, naming the inventors of Martin R. Frank, Walter M. Tseng, Charles E. Groom, and Fred F. Sadaghiani, entitled "Collaborative Structured Tagging for Item Encyclopedias." The '539 application is incorporated herein by reference in its entirety.

BACKGROUND

A tag generally refers to metadata which identifies a feature of a content item. In some traditional systems, a pre-established reference system governs the naming and application of the tags. More recently, systems have been developed that allow users to define their own tags in collaborative fashion, thereby creating a so-called folksonomy. A well known service that allows users to interact in a collaborative tagging environment is "del.icoi.us" (Delicious).

FIG. 1 describes certain features of a known collaborative tagging environment. In this system, assume that three representative users (user 1, user 2, and user n) have created user-defined tags to characterize two websites. A first website 102 contains information about a hypothetical Sedan-X manufactured by ABC Co. A second website 104 contains information about a hypothetical Sedan-Y manufactured by LMN Co. Assume that the first user defines a tag "Sedan-X" 106 to characterize the first website 102 and a tag "Sedan" 108 to characterize the second website 104. The second user defines a tag "Sedan-X" 110 to characterize the first website 102 (thereby agreeing with the first user), as well as a tag "Midsize" 112 to characterize the second website 104. The third user defines a tag "Sedan" 114 to characterize the first website 102 and a tag "4.0 Liter" 116 to characterize the second website 104. As can be appreciated, many additional users may also create tags to describe the first website 102 and the second website 104.

A tagging system can inform users of divergent vocabulary used to describe items. A tagging system can also notify users of commonly used tags. For example, the tagging system of FIG. 1 can inform the users that multiple users have applied the tag "Sedan" to characterize the first website 102. In this sense, when users annotate a particular item, they can be considered as voting on a particular interpretation of the item. However, the tagging system is not providing any insight here beyond providing a "flat" historical record of the tagging behavior of users. For this reason, it is difficult to draw meaningful conclusions from this type of collection of tags.

For at least the above-identified reasons, there is a need for more satisfactory tagging systems.

SUMMARY

A system is described which allows a user to define a relational tag. The relational tag expressly describes how a first item is related to a second item. For instance, the relational tag may state that the first item is ranked above the second item within an identified context. When utilized by many users, the system forms a graph of interconnected items. The system can perform comparative analysis within this graph. For instance, based on the relational tags, the system can determine the top-ranking within the graph.

Additional exemplary implementations and attendant benefits are described in the following.

Figure 1:
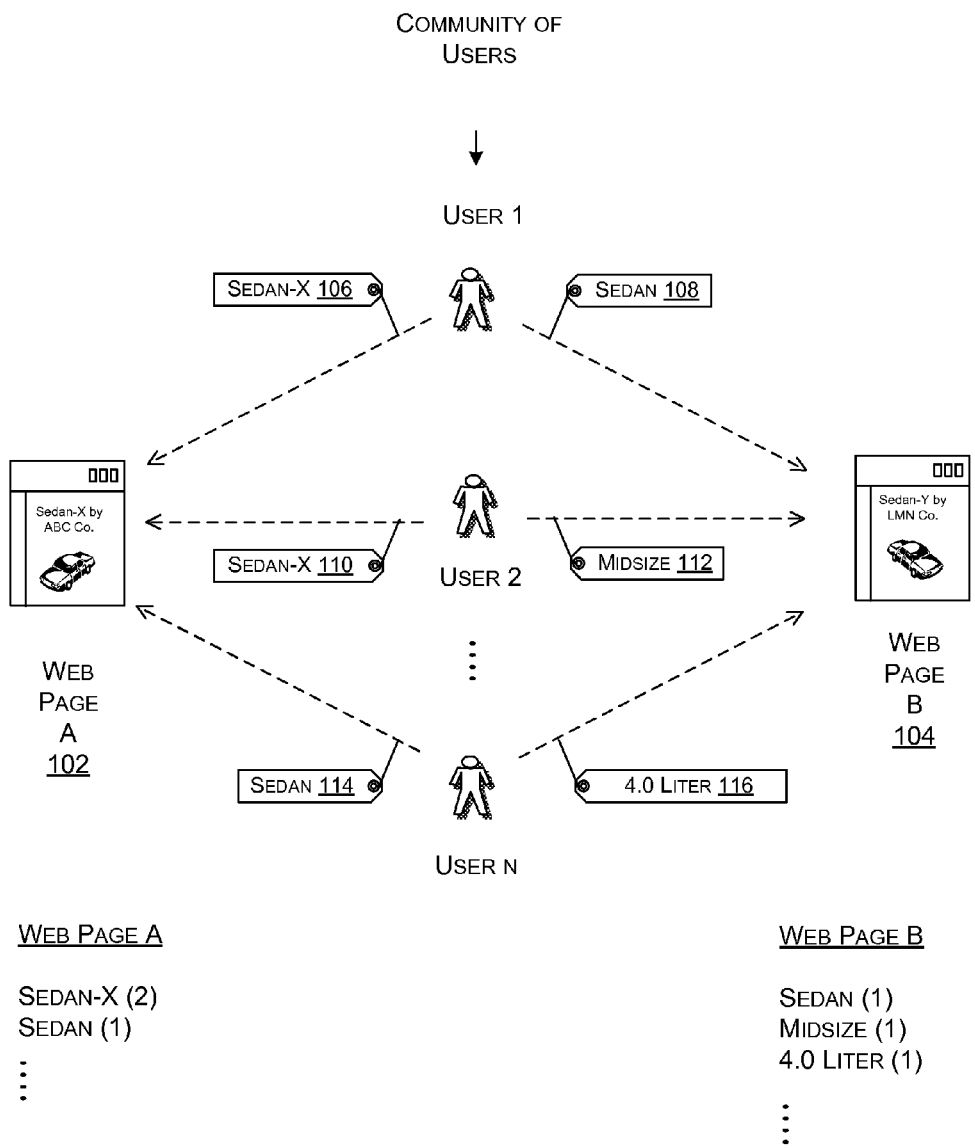
FIG. 1 shows a known type of collaborative tagging system.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure sets forth a system for creating relational tags. Each relational tag describes how an item, generically represented as "X" is related to at least one other item, generically represented as "Y", based on a relationship "R", within a context "C." To facilitate discussion, the term "base item" is used to refer to the item X. That is, the base item refers to the item which is being tagged. The term "other item" is used to denote the item Y. That is, the other item refers to an item with which the base item is being compared. In one relationship, the user defines the base item X as being better than or worse than the item Y, or more generally, as being ranked higher than or lower than the item Y. However, as will be explained, the relationship R can link the base item X with the other item Y in other ways.

The disclosure also sets forth a system for performing comparative analysis based on a collection of relational tags. For instance, the system can apply transitive analysis to determine which item is ranked highest, which item is ranked lowest, and so on.

The term "item" refers to any kind of object. In one example, an item may correspond to something that can be acquired (e.g., purchased) by the user, such as media content (a book, a musical piece, etc.), a tangible article (e.g., an automobile, a camera, etc.), a service, downloadable digital content of any nature, and so forth. The system may electronically describe an item using an "item record". In other cases, the object being described with tags is an informational item (such as a website that caters to a certain theme), there being no underlying physical object associated with the informational item. In brief, then, the term "item" is to be liberally and generally construed as used herein.

This disclosure includes the following sections. Section A describes an exemplary system for creating and utilizing relational tags. Section B describes exemplary procedures that explain the operation of the system of Section A.

A. Exemplary Systems

As a preliminary matter, the terms logic, module, or functionality generally represent hardware, software, firmware or a combination of these elements, or yet some other kind of implementation. For instance, in the case of a software implementation, the terms logic, module, or functionality represent program code that perform specified tasks when executed on a processing device or devices (e.g., CPU or CPUs). The program code can be stored in one or more machine-readable media.

The term machine-readable media or the like refers to any kind of medium for retaining information in any form, including various kinds of storage devices (magnetic, optical, static, etc.). The term machine-readable media also encompasses transitory forms of representing information, including various hardwired and/or wireless links for transmitting the information from one point to another.

A.1. Exemplary Relational Tagging Paradigm

Prior to discussing exemplary systems that rely on a relational tagging strategy, by way of introduction, this section addresses certain features of the tagging strategy itself.

Figure 2:
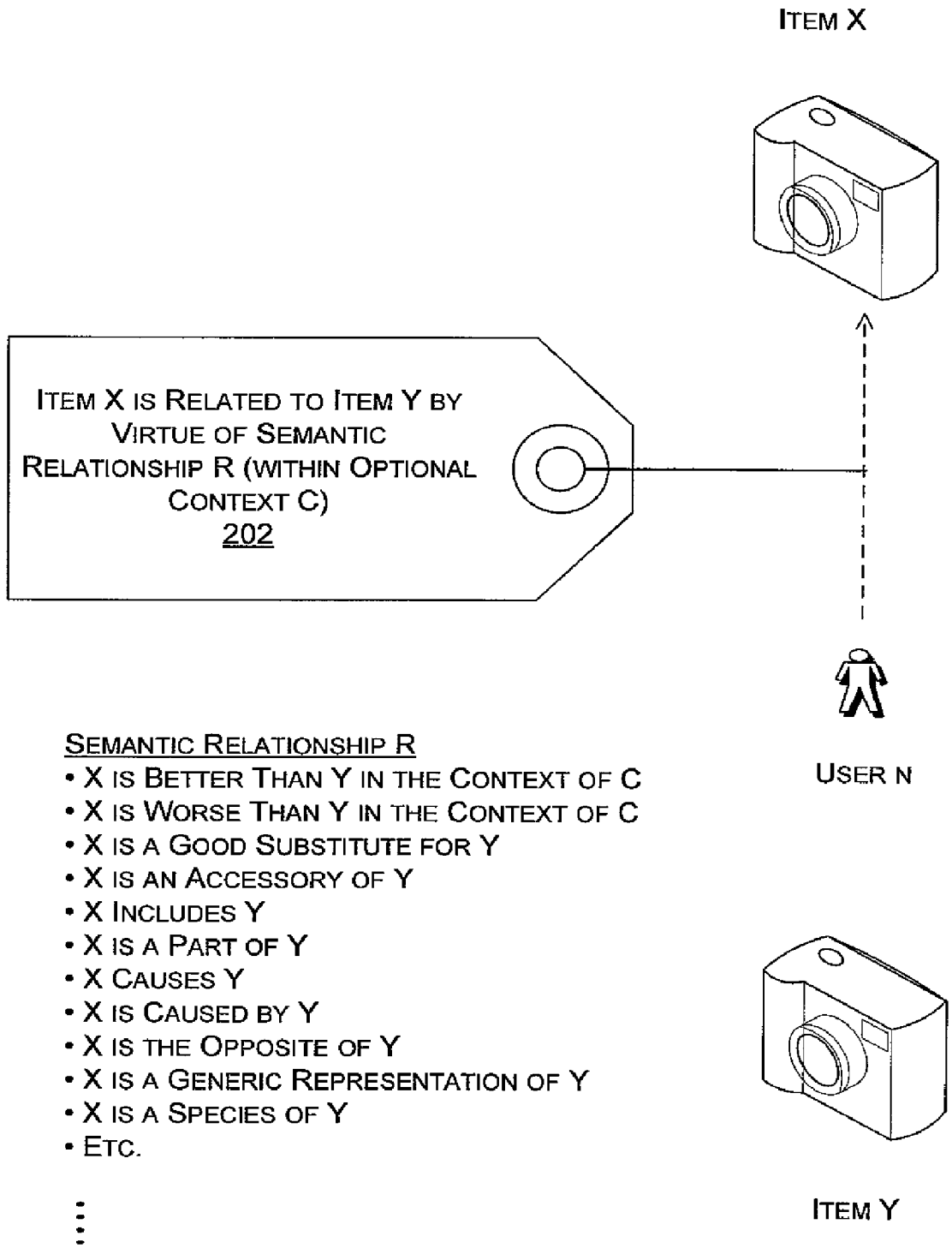
FIGS. 2 and 3 show an overview of an exemplary tagging strategy that employs the use of relational tags, where each relational tag relates a base item to at least one other item in a defined context.

FIG. 2 shows a scenario in which a user creates a relational tag 202 to characterize an item X. In this illustrative case, item X is a commercially available digital camera. In broad terms, the relational tag 202 describes how item X differs from one or more other items, such as a hypothetical item Y, optionally within some context C. In other words, the relational tag 202 expresses a relative distinction between items X and Y within some context C. Item Y may correspond to another digital camera produced by another manufacturer. The relational tag 202 links item X together with item Y based on a relationship R. The optional context C describes the environment (or set of conditions) that qualify the identified relationship between X and Y. Stated another way, the context C sets forth the reasoning why the relationship between X and Y is considered to hold true.

Different kinds of nexuses can be used to define the relationship R. One relationship is a better-than type of relationship, or more generally, any kind of comparative relationship in which one item is ranked above or below another item for any reason. Namely, the tag 202 can state that item X is better than item Y within a certain context C. Alternatively, the same effect can be achieved by tagging item Y to indicate that it is worse than item X within the context C. For this kind of relationship R, the context C can define the qualifying circumstance in which item X is ranked higher than or lower than item Y. For instance, one or more tags can be used to convey that item X is a better camera for taking photographs in the rain than item Y, the context here being the suitability of the camera for taking photographs in the rain. One or more other tags can be used to convey that item X would make a better gift for Father's Day than item Y, the context here being the suitability of the camera for a Father's Day gift. Many other examples can be provided. An item may be superior to other items in one context, yet inferior to other items in another context.

The tag 202 can express other relationships R, including, without limitation, any one or more of the following list of relationships. Although not stated, any of these relationships can optionally be defined as relating to a context C, in a similar manner to that described above.

X is a good substitute for item Y. Another relationship R can convey that item X is a good substitute for item Y.

X is an accessory of item Y. Another relationship R can convey that item X can be used as an accessory of item Y (or more generally, in conjunction with item Y).

X includes Y, or X is part of Y. Another relationship R can convey that item X is a part within item Y. Another relationship expresses the opposite, namely that item X is an encompassing whole that includes item Y as a member.

X causes Y, or X is caused by Y. Another relationship can convey that item X is an event that is one contributing factor that causes item Y. Another relationship expresses the opposite, namely that item X is caused by item Y.

X is the opposite of Y. Another relationship can convey that item X is the opposite of item Y. Another relationship can express the opposite, namely that item X is the same (or generally the same) as item Y.

X is a generic representation of Y, or X is a species of Y. Another relationship expresses that X is a genus having Y as a species. Another relationship can express the opposite, namely that item X is a species of item Y.

Again, the tag 202 can express yet other kinds of relationships between item X and item Y, the above list being non-exhaustive. Different groups of relationships may be particularly appropriate for different respective applications. For example, in an online shopping application, at least the following relationships may be particularly appropriate: X is ranked above or below item Y for any stated reason; X is a good substitute for Y; X is an accessory of Y; X is less expensive than Y; X is better quality than Y; X is more current than Y, and so on.

In another variation, a single tag 202 can relate item X to plural other items, such as items P, Q, and R. Alternatively, the user may create plural relational tags which relate item X to items, P, Q, and R, e.g., a first tag that relates item X to item P, a second tag that relates item X to item Q, a third tag that relates item X to item R, and so on.

The system can use the types of relational tags shown in FIG. 2 to perform comparative analysis. The type of comparative analysis that is performed may depend, in part, on the nature of the relationships expressed by the tags.

Figure 3:
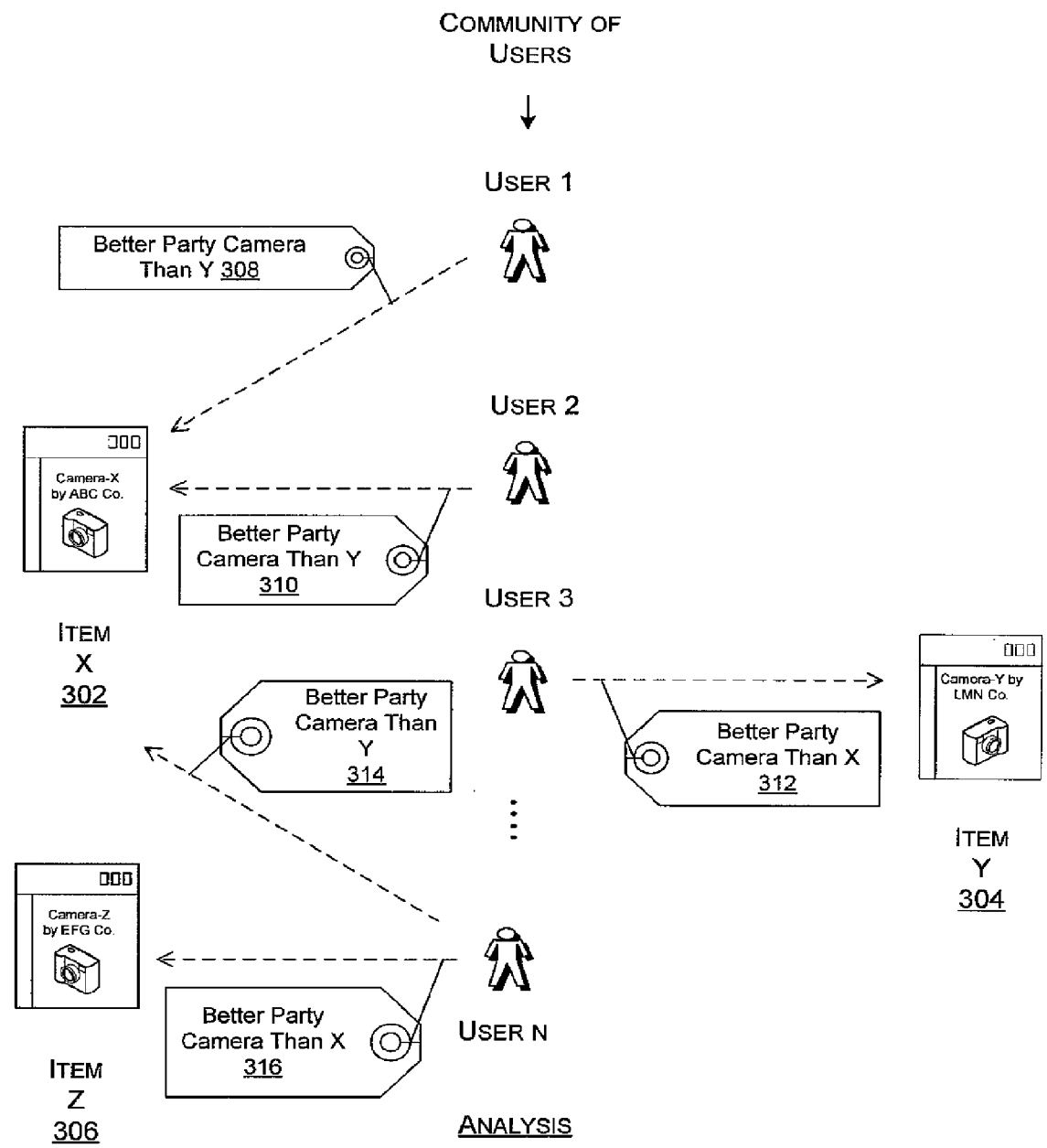

Consider, for example, the representative case of FIG. 3. Here, the relational tags express a better-than type of relationship, or more generally, any kind of comparative relationship. Namely, for this particular type of tag, a user associates the tag with a base item X to indicate that the base item X is ranked higher than some other identified item Y. The use of this type of relational tag allows the system to rank the items from worst to best or from best to worst. The ranking is performed in the specific context of "party camera", or more fully stated, the suitability of a camera for taking pictures at a party. Thus, when a user tags an item X as being better than an item Y, she is saying that camera X is better than camera Y for taking pictures at a party.

More specifically, in the hypothetical scenario of FIG. 3, four representative users have created relational tags to characterize three items. As to these three items, item X 302 is associated with a web page describing a still image camera X produced by ABC Co. Item Y 304 is associated with a web page describing a still image camera Y produced by LMN Co. Item Z 306 is associated with a web page describing a still image camera Z produced by EFG Co. The first user creates a tag 308 to annotate item X 302, indicating that item X 302 is better than item Y 304 for taking pictures at a party (where this qualifying context is left unstated in the remaining explanation of FIG. 3). The second user creates a tag 310 to annotate item X 302, also indicating that item X 302 is better than item Y 304. A third user creates a tag 312 which disagrees with the first two users; namely, the third user creates the tag 312 to annotate item Y 304, indicating that item Y 304 is better than item X 302. A fourth user creates two tags. A first tag annotates item X 302, concurring with the first two users that item X 302 is better than item Y 304. The second tag annotates item X 306, indicating that item Z 306 is better than item X 302. Instead of, or in addition to, "better-than" types of tags, the user may create tags which indicate that certain web pages are worse than other web pages. (More generally, comparisons can be expressed in terms of one item being ranked above or below another item for any reason.) Other comparative tags, such as a "same as" tag, a "similar to" tag, and a "good substitute for" tag, are also envisioned.

It will be appreciated that the tagging behavior shown in FIG. 3 can be duplicated by many users, creating a large store of relational tags. More specifically, due to the use of relational tags to characterize items, the store can form a graph of interconnected items (which can also be characterized as a relational mesh or web, etc.). In this graph, items can be directly related, or more often, indirectly related by a chain of individual links.

Other entities besides human users can create and edit tags. For example, any kind of device, application, system, etc., can automatically annotate one or more items with tags. For example, a merchant-related application can automatically note, based on the online behavior of users (or other empirical evidence), that item X is more popular than item Y. Such online behavior can comprise sales data, shopping cart selection data, click-through data, and/or other information. Based on this information, the application can automatically annotate an item record corresponding to item X with a relational tag to indicate that item X is more popular than item Y. Other applications can automatically apply other types of relational tags to items to express other kinds of relationships among items.

The system can perform comparative analysis to derive conclusions based on the graph of interconnected items. For example, the system can determine, based on the aggregated tagging results, that item X is most likely better than item Y and that item Z is better than item X. Thus, though transitive logic, the system can determine that item Z is the best item and item Y is the worst item (in the specific context of the suitability of cameras of taking pictures at parties). Moreover, the system can attach levels of confidence to these output results, such as by providing an output score which represents the level of disagreement among users regarding certain tags, and/or which represents the size of the sampling pool on which conclusions have been reached.

In the example of FIG. 3, a group of users has collaboratively tagged a collection of items corresponding to cameras that predominately take static (still) digital images. However, the strategy described herein places no limitation on the kinds of comparisons that users may make. The strategy specifically permits the users to make cross-category comparisons, or even relatively idiosyncratic comparisons. For instance, in the context of FIG. 3, a user may create a tag that specifies that still image Camera-X is a better party camera than a certain video camera. In a yet more divergent vein, the user can idiosyncratically indicate that a certain human professional photographer is better than Camera-X for taking pictures at parties, by which the user may possibly mean that she receives better results using this professional photographer than taking her own pictures with Camera-X.

As will be described more fully in a later subsection, the strategy may also allow the user to annotate items with category tags. On the basis of this provision, the strategy may allow the user to filter a graph of interconnected items to extract relationships within a certain category, such as digital still cameras. This, in turn, allows the strategy to perform transitive analysis among items that are restricted to a specific category.

A.2. Exemplary System

Figure 4:
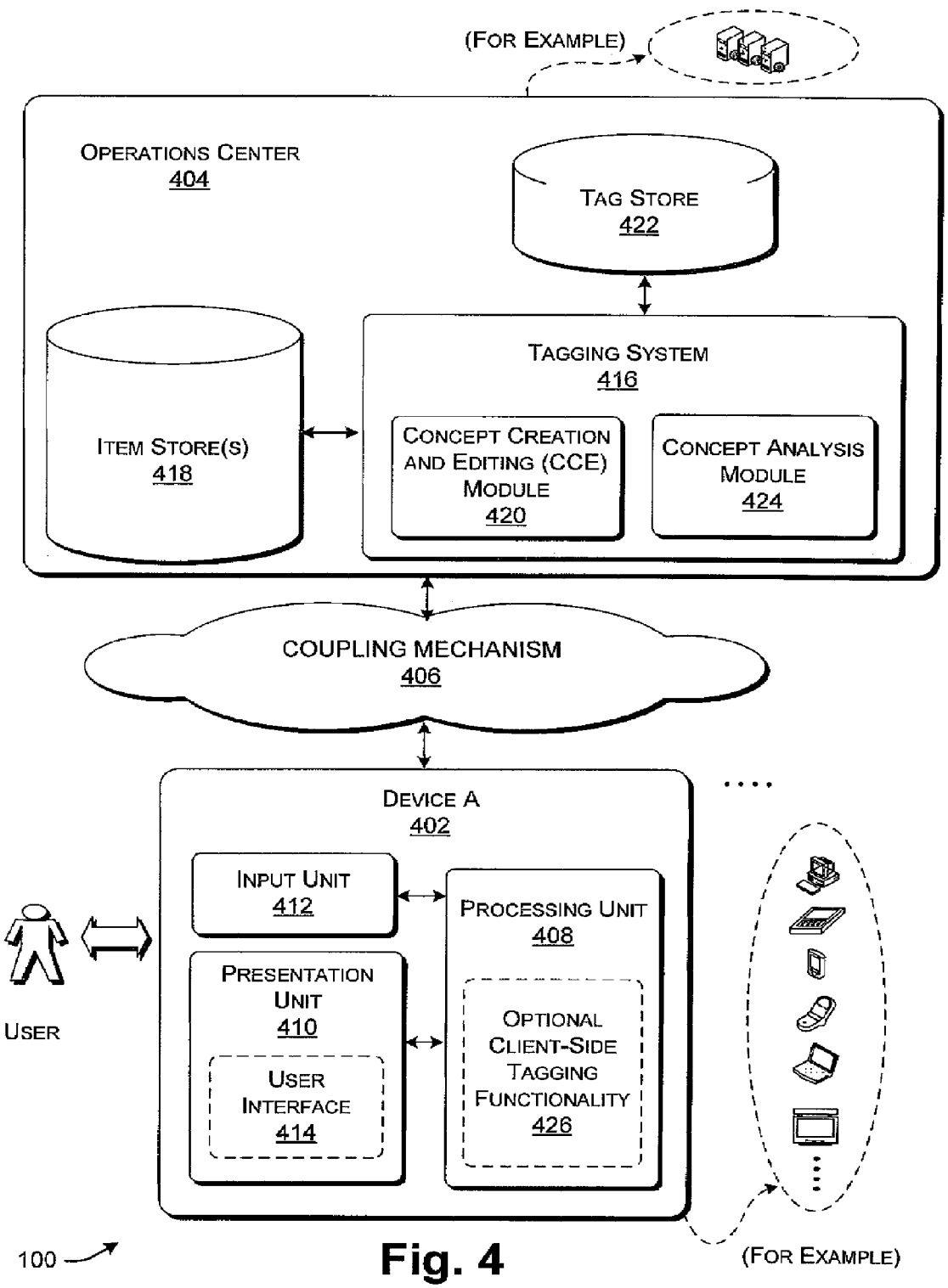
FIG. 4 shows an exemplary tagging system which adopts the tagging strategy of FIGS. 2 and 3.

FIG. 4 shows an overview of one exemplary system 400 for creating and utilizing relational tags. In system 400, a plurality of devices, such as representative device 402, are coupled to an operations center 404 by a coupling mechanism 406. The explanation provided below with respect to the representative device 402 likewise applies to other devices (not shown), unless otherwise noted.

Beginning with the hardware-related aspects of the system 400, the operations center 404 can be implemented as one or more server computers (e.g., as a "farm" of such computer servers) and associated databases. The architecture of the operations center 404 can be separated into front-end components that interface directly with the device 402 and back-end components that can perform offline analysis. Generally, the components of the operations center 404 can be located at a single site, or distributed over plural sites, and managed by a single entity or plural entities.

The device 402 represents any kind of electronic unit which can interact with the operations center 404 via the coupling mechanism 406. In the most common case, the device 402 corresponds to a computer device, such as a personal computer, laptop computer, and so forth. But the device 402 may also correspond to a mobile telephone, a Personal Digital Assistant (PDA) device, a set-top box coupled to a television, a stylus-type input device, any kind of wearable computer, an electronic book-reader device, a personal media player, a game console device, and so forth. In any event, the device 402 can comprise as main parts: a processing unit 408; a presentation unit 410; and an input unit 412. The processing unit 408 generally corresponds to functionality (e.g., software logic, and/or circuitry, etc.) for processing information. The presentation unit 410 generally corresponds to any mechanism or combination of mechanisms for presenting the processed information. For example, the presentation unit 410 can present a graphical user interface 414 for interacting with the user. The input unit 412 generally corresponds to any mechanism or combination of mechanisms for inputting data and instructions to the processing unit 408.

Figure 11:
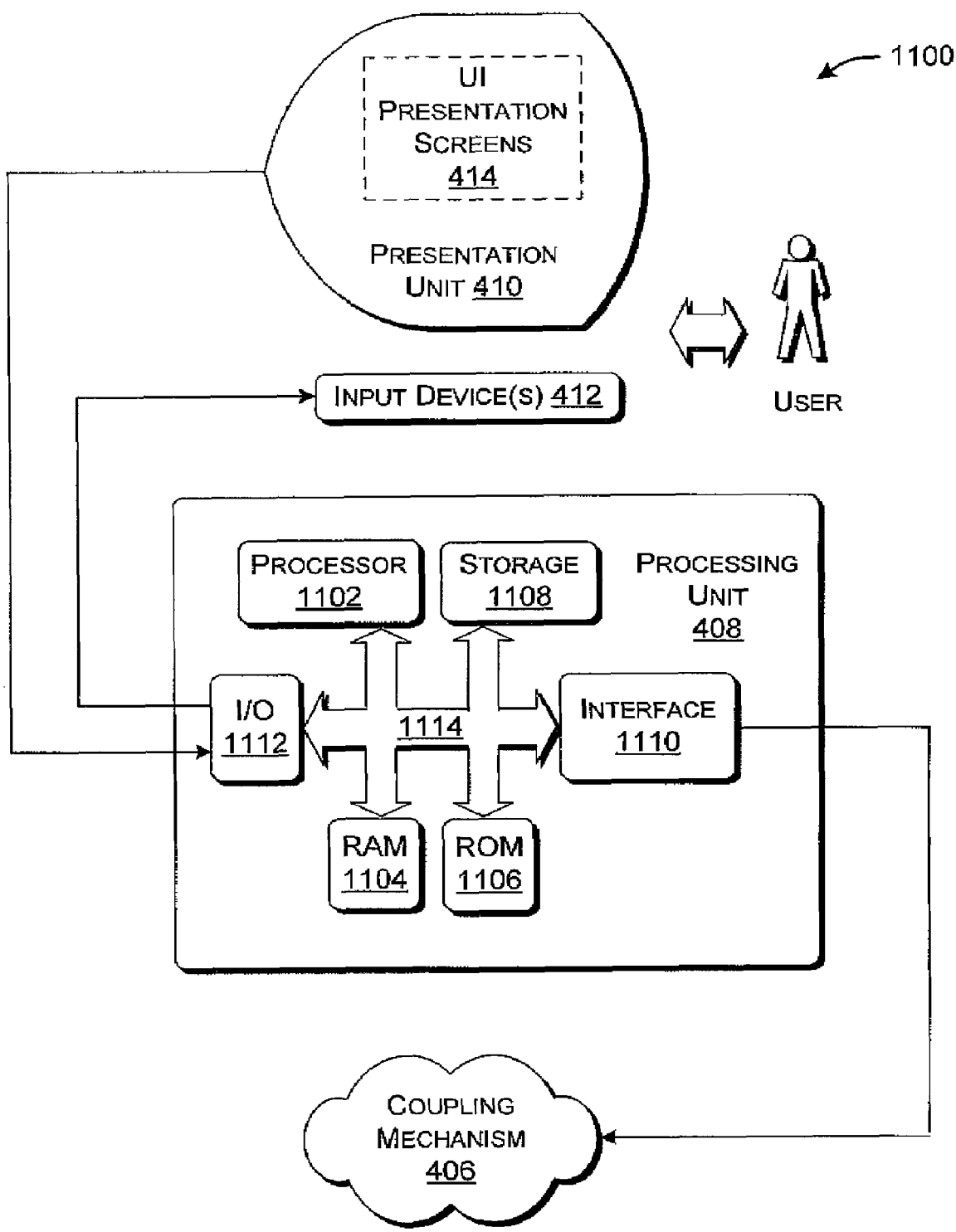
FIG. 11 shows exemplary processing functionality for implementing any aspect of the system shown in FIG. 4.

FIG. 11, to be discussed below, in turn, provides additional details regarding equipment that can be use to implement any aspect of the operations center 404 or the representative device 402.

The coupling mechanism 406 can correspond to any kind of communication conduit or combination of communication conduits. In the case most commonly evoked in this disclosure, the coupling mechanism 406 corresponds to a wide area network, such as the Internet. However, the coupling mechanism 406 can alternatively, or in addition, comprise other kinds of communication conduits, such as an intranet, point-to-point coupling arrangement, and so forth. In any case, the coupling mechanism 406 can include any combination of hardwired links, wireless links, routers, repeaters, gateways, name servers, and so forth (not shown), governed by any protocol or combination of protocols.

The functional aspects of the system 400 are now set forth in greater detail, starting with the operations center 404. In one case, the operations center 404 may represent a website or multiple websites maintained by a single entity or multiple entities. The operations center 404 can handle requests from the device 402, and can serve, in response, various web pages that can be rendered at the device 402 (e.g., using browsing functionality implemented by the device 402).

The operations center 404 can include a tagging system 416. The purpose of the tagging system 416 is to annotate items stored in one or more item stores 418 (referred to in the singular below for ease of reference). The item store 418 can correspond to a database of item records maintained by an online merchant. In this context, each item in the item store 418 represents an item that a user can purchase or otherwise acquire. In one implementation, a single entity can administer both the tagging system 416 and the item store 418. Alternatively, different entities can respectively administer the tagging system 416 and the item store 418.

In another application, the items in the item store 418 can correspond to any kind of informational items that do not necessarily have merchandisable counterparts. In one case, for instance, the item store 418 can broadly represent a collection of items associated with websites (and thus loosely represents the storage capacity of the entire Internet). A user can use the tagging system 416 to annotate the items associated with the websites.

Still other applications are possible.

FIG. 4 shows that the tagging system 416 can include two main modules. A concept creation and editing (CCE) module 420 allows a user to create and potentially edit tags. The tags annotate items with supplemental information. The CCE module 420 can store these tags in a tag store 422. The tagging system 416 also includes a concept analysis module 424. The purpose of the concept analysis module 424 is to perform analysis on items based on the tags created by the CCE module 420.

Finally, it should be noted that one or more functions described above as being implemented by the operations center 404 can alternatively, or in addition, be performed on a local level by the devices, such as by device 402. To generically represent this feature, FIG. 4 shows that the device 402 includes optional client-side tagging functionality 426.

A.3. Exemplary Techniques for Inputting Relational Tags

As stated above, the purpose of the concept creation and editing (CCE) module 420 is to create relational tags and to potentially edit previously created relational tags. To this end, the CCE module 420 can employ multiple different types of input techniques. FIGS. 5A-5D show four representative techniques, although other techniques can be used that are not illustrated.

Figure 5A:
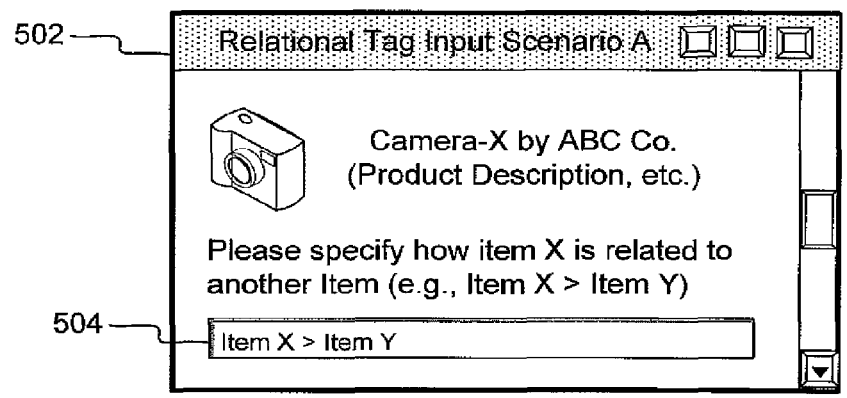
FIGS. 5A, 5B, 5C, and 5D show functionality for use in the system of FIG. 4 that allows a user to create a relational tag.

In a first technique shown in FIG. 5A, the CCE module 420 can provide a page 502 to the user that includes an input field 504 for entering a relational tag in free-form fashion. In one exemplary application, the page 502 can correspond to a product detail page which shows details regarding an item being offered for sale, namely the hypothetical Camera-X produced by ABC Co. The input field 504 allows the user to input a tag which sets forth how the item "Camera-X" differs from some other item, such as a hypothetical Camera-Y produced by another manufacturer. The input field 504 allows the user to enter this relationship as a free-form textual expression. In the example illustrated in FIG. 5A, the user opts to express this relationship in quasi-mathematical terms by typing the expression "Item X>Item Y". The CCE module 420 can interpret the user's input by attempting to match the input against predetermined patterns of relational expressions, with reference to a database of rules and telltale keywords (e.g., "better", "worse", "higher", "lower", "above", "below", "greater", "lesser", etc.), and so on. For instance, assume that a user inputs the tag "is better Father's Day gift than Minolta XYZ". The CCE module 420 can first detect that the tag includes the keyword "better", which means that the user is creating a comparative-type of tag, which has a characteristic structure. The CCE module 420 can then extract the subject (or target) of the comparative relationship, namely "Minolta XYZ". That is, the name "Minolta XYZ" is likely the subject of the expression because it follows the telltale word "than". The remaining phrase ("Father's Day gift") can be interpreted as the qualifying context of the expression. To facilitate this interpretation task, the CCE module 420 can provide guidance to the user that informs the user how he or she might structure the relational expression. The CCE module 420 can also query the user for clarification if it cannot readily interpret the relationship that the user has entered.

Figure 5B:
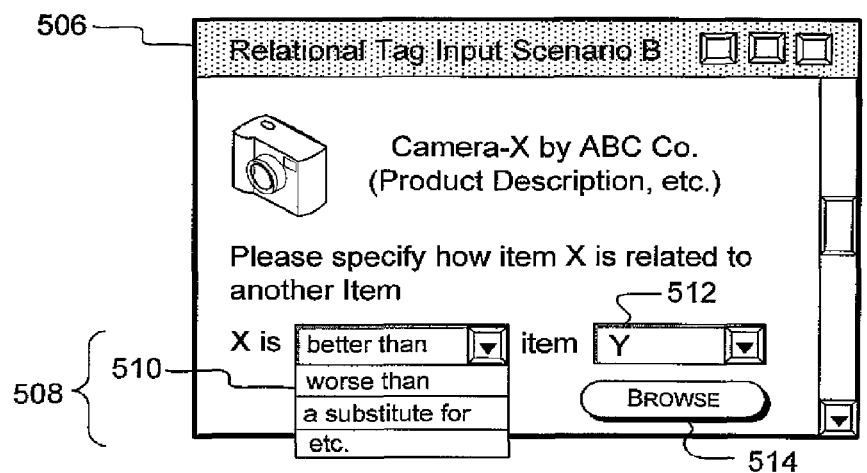

In a second technique shown in FIG. 5B, the CCE module 420 can provide a page 506 that provides a more structured input field 508 for entering a relational expression. Namely, in one illustrative case, a drop-down menu 510 is provided that identifies various relationships that the user may choose from, such as, but not limited to, "better than", "worse than", "substitute for", "accessory to", and so on. Alternatively, or in addition, the relationships can be alternatively be expressed in mathematical terms, such as using the symbols, <, >, ≈, and so on. The input field 508 can include another drop-down menu 512 for selecting another item against which item X is to be compared, in this case, item Y. To facilitate selection of the other item, the input field 508 can also optionally include a browse command 514 or other command field. The input field 508 allows the user to browse a database of items against which the item X may be compared. Clicking on an item in the database (e.g., item Y) causes the CCE module 420 to insert an identifier associated with this item into the relational expression being developed via the input field 508.

Figure 5C:
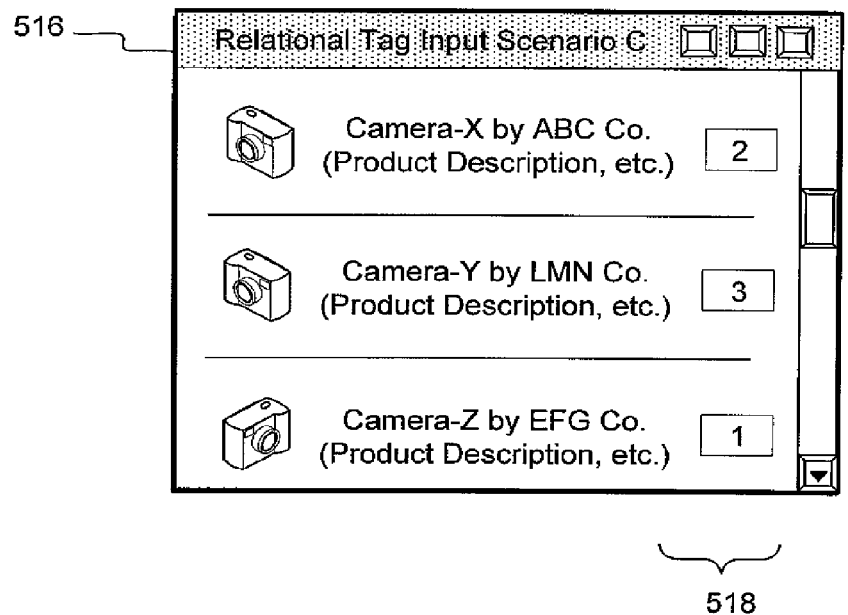

In a third technique shown in FIG. 5C, the CCE module 420 can provide a page 516 that shows multiple products being offered, such as Camera-X, Camera-Y, and Camera-Z. This page 516 includes an input field 518 for performing multi-item ranking. In this case, by virtue of numbers entered into the input field 518, the user indicates that Camera-Z is best and Camera-Y is worst. In response to this global type of input, the CCE module 420 can potentially create multiple relational tags, e.g., by creating a tag for item X which indicates that it is better than item Y, and by creating another tag for item X which indicates that item X is worse than item Z.

Figure 5D:
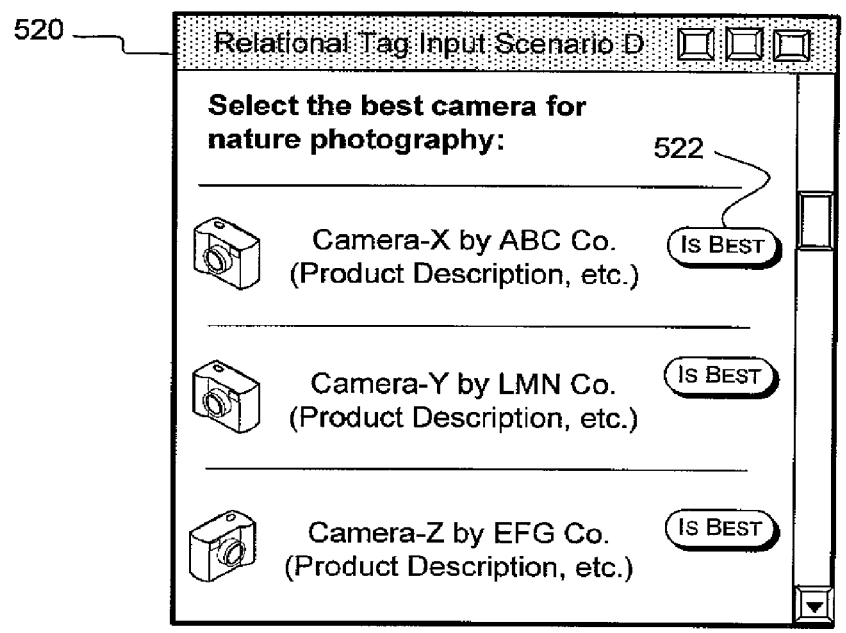

In a fourth technique shown in FIG. 5D, the CCE module 420 can provide another page 520 that shows multiple products being offered, such as Camera-X, Camera-Y, and Camera-Z. Each of the items has an "Is Best" command button associated therewith, such as the "Is Best" button 522 associated with the first item, "Camera-X". The user can identify which item is considered best by activating the "Is Best" command button associated with the identified item. Compared to case of FIG. 5C, the page 520 shown in FIG. 5D allows the user to more directly and easily specify which item is considered best, or more generally, which item is ranked the highest. Still additional input provisions can be used to input relational tags. The input techniques shown in FIGS. 5A-5D are merely illustrative.

A.4. Exemplary Mechanisms for Analyzing Items Based on Relational Tags

Figure 6:
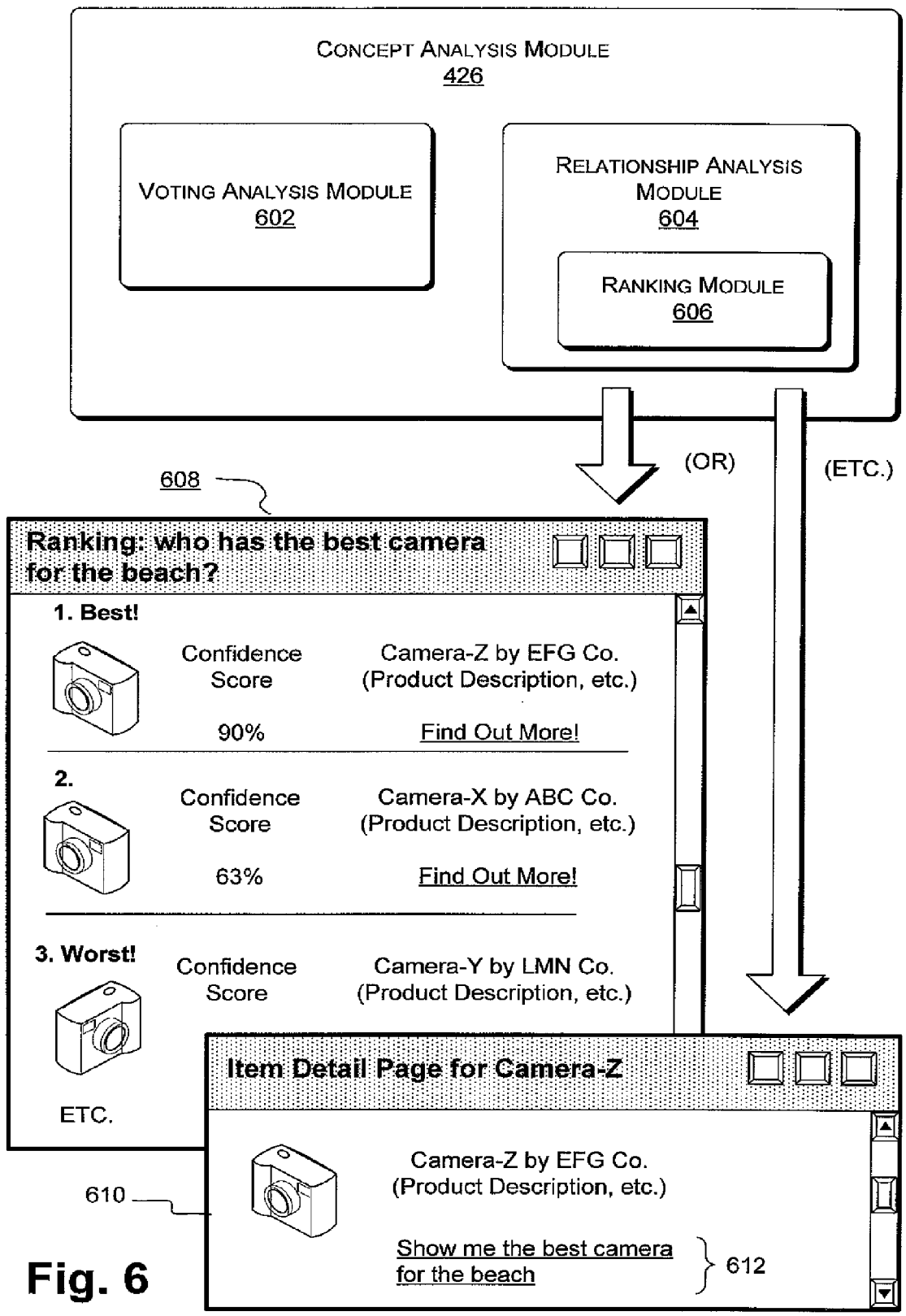
FIG. 6 shows functionality for use in the system of FIG. 4 that allows a user to perform comparative analysis based on a collection of relational tags.

FIG. 6 describes the concept analysis module 424 in greater detail. As stated above, one purpose of the concept analysis module 424 is to perform cross-item comparisons based on the relational tags (and, if provided, the use of category tags, to be described in the next subsection). To this end, the concept analysis module 424 includes a voting analysis module 602 and a relationship analysis module 604.

The voting analysis module 602 performs aggregative and statistical analysis regarding the tags created by multiple users in a collaborative environment. For instance, suppose that 70 users create tags which indicate that item X is better than item Y, but 30 users indicate that item Y is better than item X. The voting analysis module 602 can tally these votes and provide a level of confidence to an assessment that item X is better than item Y, e.g., by indicating that the statement X>Y can be expressed with a confidence level that is related to the ratio of 0.7. The confidence level may generally be a function of both the level of agreement among users and the size of the sampling pool from which a conclusion has been reached.

The relationship analysis module 604 may analyze a relatively large collection of relational tags established by multiple users, the tags describing how multiple base items differ from respective multiple other items. As described above, a sufficiently robust population of relational tags may create a rich graph of interconnected items. The purpose of the relationship analysis module 604 is to mine this graph and derive conclusions from the graph. In one case, where items are tagged with "higher-than" type comparative tags, the relationship analysis module 604 can employ a ranking module 606 to sort the items, based on the relational tags, e.g., from highest to lowest or from lowest to highest.

FIG. 6 shows one exemplary output of the relationship analysis module 604 in the form of a ranking display page 608. The ranking display page 608 presents a ranked list of items. The ranking display page 608 can also optionally convey confidence metrics which pertain to the reliability of its conclusions.

Another exemplary output of the relationship analysis module 604 is display page 610. This page 610 may provide information regarding a featured product, such as a Camera-Z. As part of the descriptive information, the page 610 can provide information which conveys how Camera-Z compares with some other camera (or plural cameras) within a defined qualifying context. For example, the page 610 includes a hypertext link 612 or other type of prompt. The hypertext link 612 allows the user to access information that reveals "the best camera for the beach". The relationship analysis module 604 can present this particular kind of link 612 upon detecting that Camera-Z has been previously ranked by one or more users with respect to its suitability for beach photography (and upon detecting that Camera-Z is not generally considered the best camera for this use). By virtue of the link 612, a merchant can provide up-sell opportunities. In the circumstance in which Camera-Z happens to be judged the best, the page 610 can alert the user to this top-ranking status.

Although not shown, the page 610 can also provide a portal for cross-category comparisons. For instance, instead of inviting the user to investigate other cameras, the page 610 can present a link to a product-neutral topic, such as by providing a link that reads "Show me better gifts for Father's Day". This link may reveal one or more other items that other users have previously ranked superior to Camera-Z for the purpose of making a good Father's Day gift. These other items are not limited to other cameras. Again, the relationship analysis module 604 can select a Father's Day theme for the linking information by virtue of the fact that Camera-Z has been previously identified by one or more other users in the context of making Father's Day gift comparisons.

Those skilled in the art will appreciate that many alternative ways of conveying the output of the relationship analysis module 604 are possible.

A.5. Tag Data Structure Including Category and Fact Tags

The tagging system 416 of FIG. 4 can create relational tags that have independent utility. This is because, as set forth above, the tagging systems 420 can draw meaningful conclusions from an analysis of the relational tags alone. In another implementation, the tagging system 416 can allow the users to create other types of tags. Furthermore, the tagging system 416 can organize different kinds of tags into a data structure. Each instance of the data structure is referred to herein as a concept object. As will be described, the tagging system 416 can form more nuanced conclusions based on an analysis of concept objects that include relational tags, in addition to other kinds of tags.

Figure 7:
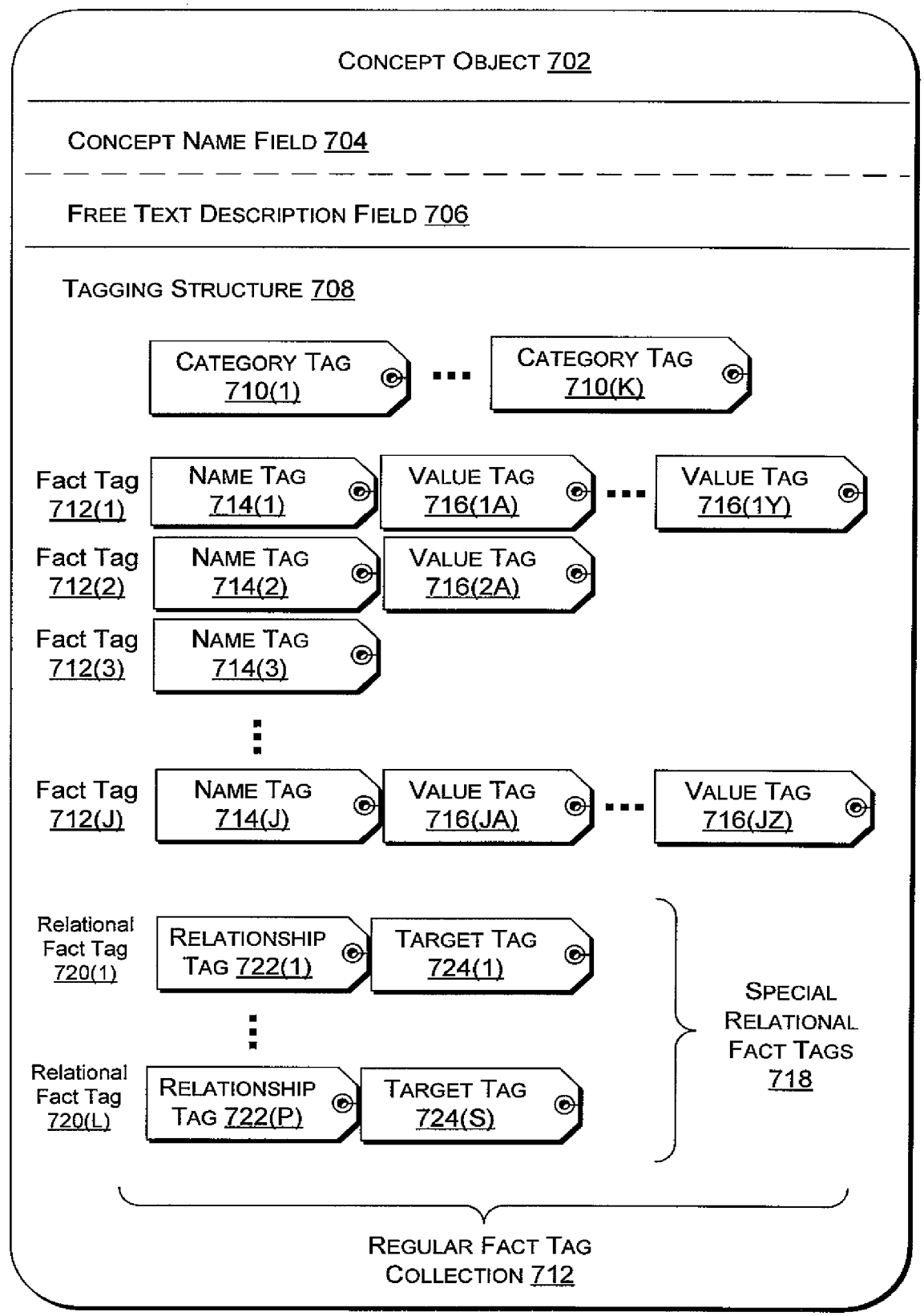
FIG. 7 shows an exemplary object that can be used to store one or more relational tags according to one exemplary implementation of the system of FIG. 4.

FIG. 7 sets forth one such concept object 702. The concept object 702 can include a concept name field 704, a free text description field 706, and a tagging data structure 708. The optional concept name field 704 contains a unique name of the concept for the purpose of identifying the concept. The optional free text description field 706 allows users to enter a description of the concept the associated item, or both.

The tagging data structure 708 associates multiple tags including one or more first or category tags 710(1)-710(K) and one or more collections of second or fact tags 712(1)-712(J). The category tags 710(1)-710(K) characterize the items in terms of generic or objective categories. For instance, suppose that the item is an Olympus® brand digital camera sold by the Olympus Corporation. In this example, a category tag might be "digital camera".

A first group of facts tags 712(1)-712(J) are associated with the concept and provide facts about an item represented by the concept. For each category tag 710(1) through 710(K), there is a set of zero or more fact tags 712 that describe the salient properties of the item. For example, suppose the item is a camping tool with an integrated flashlight and compass. The item may be tagged with two category tags, such as "Flashlight" and "Compass". The fact tags describing the attributes of this item might include one set of fact tags pertaining to the flashlight aspects of the item and another set of facts pertaining to the compass aspects of the item. Thus, associated with the category tag "Flashlight", the concept may include fact tags for the item with a name:value of "Batteries Needed: 4 AA". For the category tag "Compass, the concept may include fact tags for the item with a name:value of "Magnetic Sensitivity: High".

Each of the fact tags 712(1)-712(J) has a name portion 714 to identify an attribute of the item and one or more corresponding value portions 716 that provide one or more values of the attribute identified by the name portion. Said differently, each fact tag has a name:value pair, where there may be more than one value for each name. Moreover, the name portion 714 and the value portion(s) 716 are also tags.

Thus, each fact tag is composed of a collection of one name tag and zero or more value tags. In FIG. 7, the first fact tag 712(1) is composed of one name tag 714(1) and multiple value tags 716(1A)-716(1Y). For instance, in the digital camera example, the name tag might be "color" and the value tags might be "silver", "black", and "white". The first fact tag 712(1) is an example of a multi-part fact tag, where there are one or more value tags 716(1A)-716(1Y) associated with the name tag 714(1). The second fact tag 712(2) is composed of one name tag 714(2) and one value tag 716(2A). Here, the name tag might be "weight" and the value tag might be "4.52 oz (128 grams)". The second fact tag 712(2) is also representative of a multi-part fact tag in that it has at least one name tag 714(2) and at least one value tag 716(2A). The third fact tag 712(3) is composed of just one name tag 714(3) and no value tags. In this case, the name tag might be "weatherproof", where presence of the name tag would suggest that the item is weatherproof, and absence of the name tag would suggest that it is not. This third fact is representative of a singleton fact tag, where there are no value tags associated with the name tag 714(3). Over time, the collaboratively defined tags form a folksology to categorize the items offered in the catalog.

From one perspective, the tagging structure may be considered dimensional in that the category tags define what the item is and the fact tags, in the context of the category tags, define attributes or features of the item as characterized by the category tags. Further, the attribute or name tags are associated via the structure with one or more value tags. The tagging structure thereby provides relationships among terms that enable many useful functions for the user when exploring features of a product. Unlike previous flat tag approaches, where there is no distinction between category or fact tags, or between name tags and value tags, the non-flat tagging structure 708 allows users to easily compare multiple items according to a category selected by the user. With the flat tag approach, there is no way to describe the nature of a relationship between the tags.

For instance, suppose the user would like to compare all "digital cameras" in the item catalog. The user simply selects this category tag and all items tagged with this category tag are located, and then the related fact tags of "color" and "weight" associated with the category tag of "digital camera" are easily arranged for convenient observation. For instance, the name tags are aligned horizontally, with associated value tags grouped vertically beneath their corresponding name tags. In contrast, with a flat tag structure, where there is no distinction between digital camera, color, and weight, there is no way for the system to understand how to align the attributes upon selection of "digital camera". Furthermore, since there are no name:value pairs in the flat tag approach, there is no context for a comparison. The system has no context for how to compare "color" since there is no value associated with "color" in a flat tag approach.

To further facilitate item comparison, the tagging structure 708 can include a collection 718 of special types of fact tags 720(1)-720(L) that express relational facts associated with an item represented by the concept object 702. As explained above, each relational tag relates a base item X to another item Y within some optional context C. The relational fact tags 720(1)-720(L) therefore provide directed input from the users that expressly identifies how items relate to each other.

FIG. 7 shows one exemplary way to structure the relational fact tags 720(1)-720(L). Like other fact tags, the relational fact tags 720 include name tags 722(1)-722(P) and associated value tags 724(1)-724(S). In the case of relational fact tags, a name tag 722 expresses the nature of the relationship R and, optionally, the context C that qualifies the relationship. A value tag (also referred to as a target tag) 724 expresses the item Y with which the base item X is being compared. For instance, consider the statement "Camera X is a better beach camera than camera Y". The name tag 722 for this relationship corresponds to "is a better beach camera". The value tag 724 for this relationship corresponds to "camera Y". Since a base item represented by the concept object 702 can be compared with many other items in different contexts, the concept object 702 can include multiple relational type fact tags.

The tagging system 416 can leverage the enhanced information provided by the concept object 702 to provide more nuanced conclusions regarding a collection of tagged items. For instance, the tagging system 416 can filter a graph of interconnected items to extract only those items that belong to a certain category (or plural specified categories). The tagging system 416 can then perform transitive analysis that is localized within one or more specified categories.

A.6. Application to a Collaborative (Wiki) Environment

Figure 8:
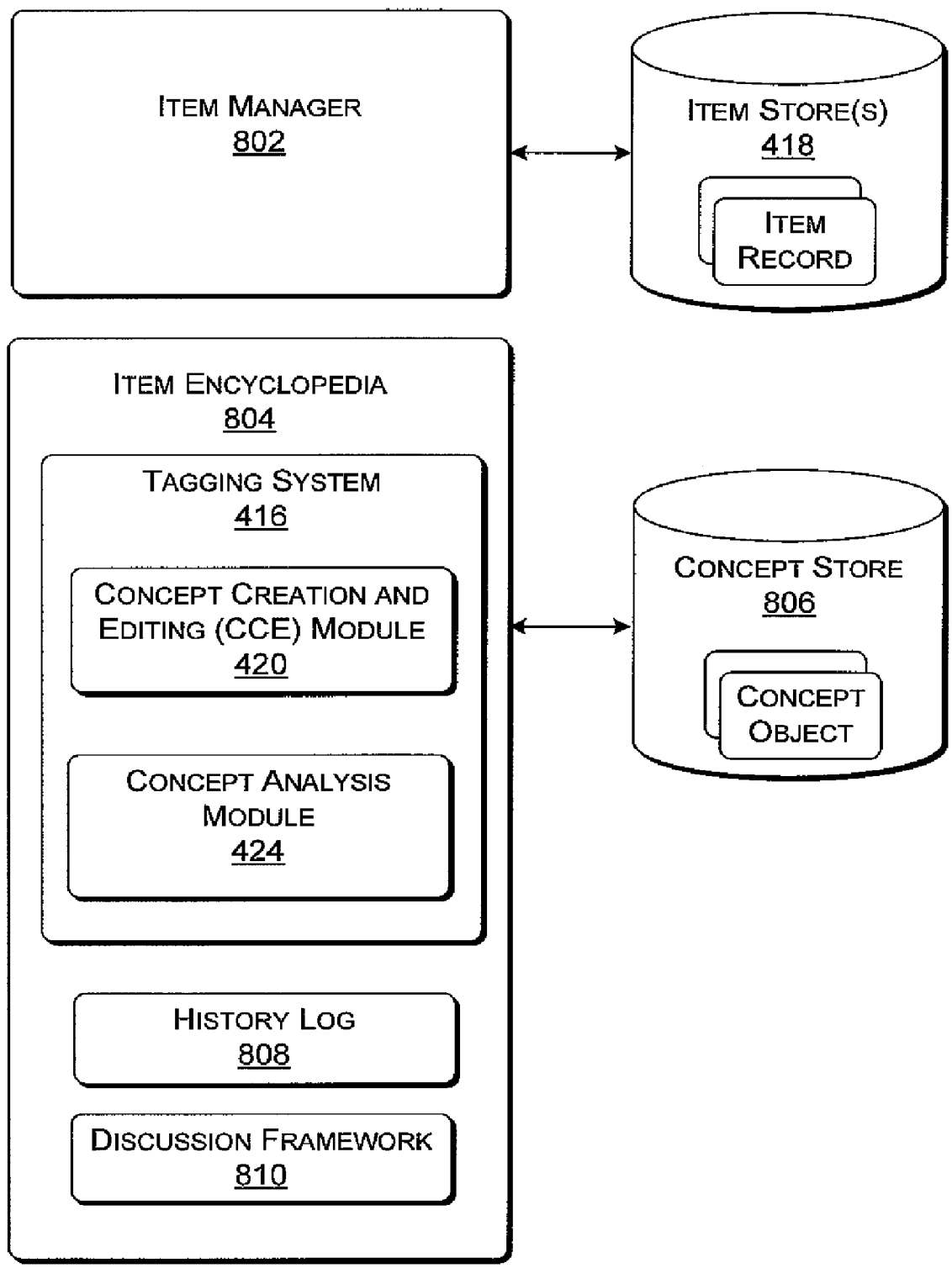
FIG. 8 shows one exemplary system that is configured to process the type of object depicted in FIG. 7, the system including an item manager and an item encyclopedia.

FIG. 8 shows the application of the system 400 of FIG. 4 to a collaborative environment. In one collaborative tagging environment, also known as known as a Wiki environment, users collaboratively contribute to the creation of articles. The articles may contain descriptive tags.

To set forth one concrete application of such a collaborative environment, the operations center 404 can represent a merchant website that allows access to one or more items. In this context, an item can represent anything that the merchant wishes to offer for sale, or that others using the merchant's website wish to offer for sale. An item can include a product, a service, or some other type of sellable unit.

The operations center 404 can maintain an item store 418 (or plural stores) of item records that describe the merchandisable items. The items records in the item database 418 may be accessible, directly or indirectly, by the device 402. Each item record contains information about an associated item being offered for sale on the website. For products such as books or music CDs, for example, the item record may contain a description, images of the product, author/artist names, publication data, pricing, shipping information, and so forth. For other types of items, the item record may contain different information appropriate for those items.

The operations center 404 can include an item manager 802. The item manager 802 facilitates access to and management of the item records in the item store 418. That is, the item manager 802 allows website operators to add or remove item records in the item store 418, and generally maintain control of the items offered by the operations center 404. When a user requests information on an item from the operations center 404, one or more servers (not shown) retrieve the item information from the item store 418 and serve a web page containing the information to the requesting user computing device. The item store 418 may contain static web pages that are pre-generated and stored prior to such requests, or may alternatively store data that is used to populate dynamic web pages that are generated in response to such requests.

The operations center 404 may also host an item encyclopedia 804. The item encyclopedia 804 offers rich authoritative information regarding the various items represented in the item store 418. More specifically, the item encyclopedia 804 facilitates creation of articles about the items. These articles may include any information helpful to a user in learning about the item and deciding whether to purchase the item. Such information may include descriptions of the items, features and specification data, images of the item, intended uses, identities of manufacturers or distributors, accessories, and so on. These articles can be served by the operations center 404 to the users to assist the users in better understanding the items.

In a collaborative environment, the encyclopedia articles are community-authored, where any number of users may add, modify, or delete content contained in the item encyclopedia 804. Thus, individual users can create new articles to describe new items being offered in the item store 418, and also edit articles crafted by other users. The edits can be logged and monitored to prevent malicious entries.

The item encyclopedia 804 also supports tagging of the items with tags to assist in navigation, search, and item comparison. These tags may be assigned by the manufacturer or supplier of the items, the website operator, and/or any member of the community. In connection therewith, the item encyclopedia 804 can include the above-described tagging system 416, including the concept creation and editing (CCE) module 420 and the concept analysis module 424.

The version of the tagging system 416 shown in FIG. 8 can be specifically configured to process the type of concept objects set forth in FIG. 7, including category tags and fact tags (including relational fact tags). In this context, the user-defined tags are added to the tagging data structure 708 as part of the concept object 702. A plurality of such concept objects is stored in a concept database 806. Once the items are tagged, the tagging system 416 may use the category tags and fact tags (including relational fact tags) to locate, organize, and compare the items. Note that the concept database 806 represents an enhanced counterpart to the tag store 422 of FIG. 4, which stores only tags (rather than data structures which include tags as components thereof).

In the collaborative environment shown in FIG. 8, the CCE module 420 allows users to author and edit articles that describe the items represented in the item store 418. The CCE module 420 also allows users to annotate the items with category tags and fact tags (including relational fact tags). In this manner, the CCE module 420 produces concept objects that contain articles, tags, and other item metadata, as expressed by the exemplary concept object 702 shown in FIG. 7.

The item encyclopedia 804 also includes the above-described concept analysis module 424. The concept analysis module 424 facilitates comparison of the items based on the category tags and fact tags (including relational fact tags). For example, when the user wishes to compare similarly tagged items (e.g., items annotated with a "digital camera" category tag), the concept analysis module 424 can locate the concepts in the concept database 806 having common category tags. This allows users to perform cross-product comparisons, that is, by aggregating items with similar characteristics and providing a convenient mechanism for the user to compare the properties of these items.

As explained above, the particular combination of category tags and relational fact tags can fine-tune the comparisons provided by the concept analysis module 424. For instance, the concept analysis module 424 can allow the user to perform better-than type comparisons in the context of a relatively narrow theme. For example, assume that a group of users has created relational tags that rank many different kinds of cameras as being suitable for taking pictures at the beach. Also assume that many users have annotated a certain class of cameras with the category tag of "video camera". Based on the combination of category tags and relational fact tags, the concept analysis module 424 can form a filtered list of video cameras, ranked according to their suitability for taking pictures at the beach.

The item encyclopedia 804 also may include a history log 808. The purpose of this module 808 is to track the changes entered by the community of users. A summary of the history log 808 can be presented to the users.

The item encyclopedia 804 also may include a discussion framework 810. This module 810 facilitates user discussion pertaining to items. For instance, the discussion framework 810 allows users to enter and post commentary regarding items. The framework 810 then formats the commentary for presentation to the user. The framework 810 also provides a mechanism for other users to offer feedback on the commentary.

The item encyclopedia 804 can include yet other types of modules (not shown in FIG. 8).

Figure 9:
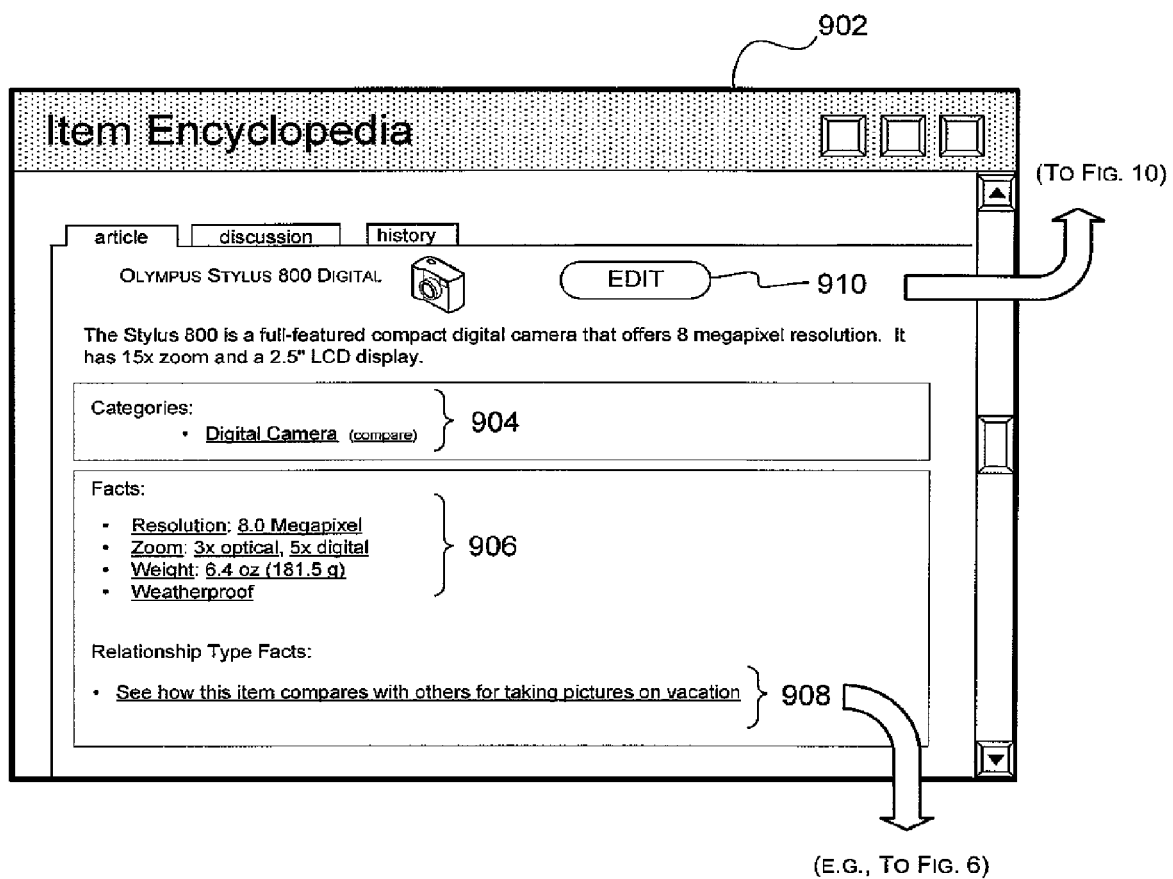
FIG. 9 shows an exemplary article page produced by the item encyclopedia of FIG. 8.

FIG. 9 shows an article page 902 that the item encyclopedia 420 can use to display an article to a user, the article having associated descriptive tags. The article page 902 optionally includes a name of the item being featured (i.e., "Olympus Stylus 800 Digital") along with an image of the camera. A description appears just below the item name and image, although other layouts may be used. The description may be an original description provided by the manufacturer, or a description crafted by the website operator, or information given by a user in the community. Moreover, the description may represent several iterations authored by multiple users in the community.

The article page 902 also has a category section 904 and a fact section 906 located beneath the description. The category section 904 lists one or more category tags to which the item may belong. In this example, the item belongs to the category "digital camera" and is represented on the page by a selectable category tag (as illustrated with underlining, although in practice the tag may be represented using other techniques, such as color variation). The contents for the category tag are provided by the category tag field(s) 710(1)-710(K) in the tagging structure 708 of the concept object 702 (see FIG. 7).

It is noted that other items maintained in the item catalog may have more than one category tag. For instance, an item titled "XYZ Radio Alarm Clock" may have multiple category tags, including one for the category "Radio" and one for the category "Alarm Clock".

Also note that the categories section 904 includes a "Compare" prompt. This prompt allows the user to make comparisons within the specified category of digital cameras. Upon selection of this compare link, the item encyclopedia 804 locates other items in the item catalog that have been tagged with the category tag "digital camera" and presents the results to the user.

The fact section 906 contains one or more fact tags that are associated with the category tag for the item. Each fact tag has a name portion identifying an attribute of the item and one or more corresponding value portions providing one or more values of the attribute identified by the name portion. For instance, in FIG. 9, the first fact tag has a name portion "Resolution" to identify the resolution attribute of the digital camera and a value portion "8.0 Megapixel" to provide the value of the resolution attribute named "Resolution".

The article page 902 also can include a relationships section 908. The relationships section 902 can display information gleaned from relational tags entered by users, constituting special types of fact tags. The relationships section 908 can display the relationship of the Olympus camera to other products in various ways. For instance, the relationships section 908 can display a list of cameras in order from best to worst, or from worst to best, etc. (or more generally, from highest ranked to lowest ranked, or vice versa). The section 908 can alternatively convey relationships using mathematical comparison symbols (e.g., "<" and ">"), and so on. Page 608 of FIG. 6 shows one exemplary and non-limiting way of conveying the user-defined relationship of items.

Figure 10:
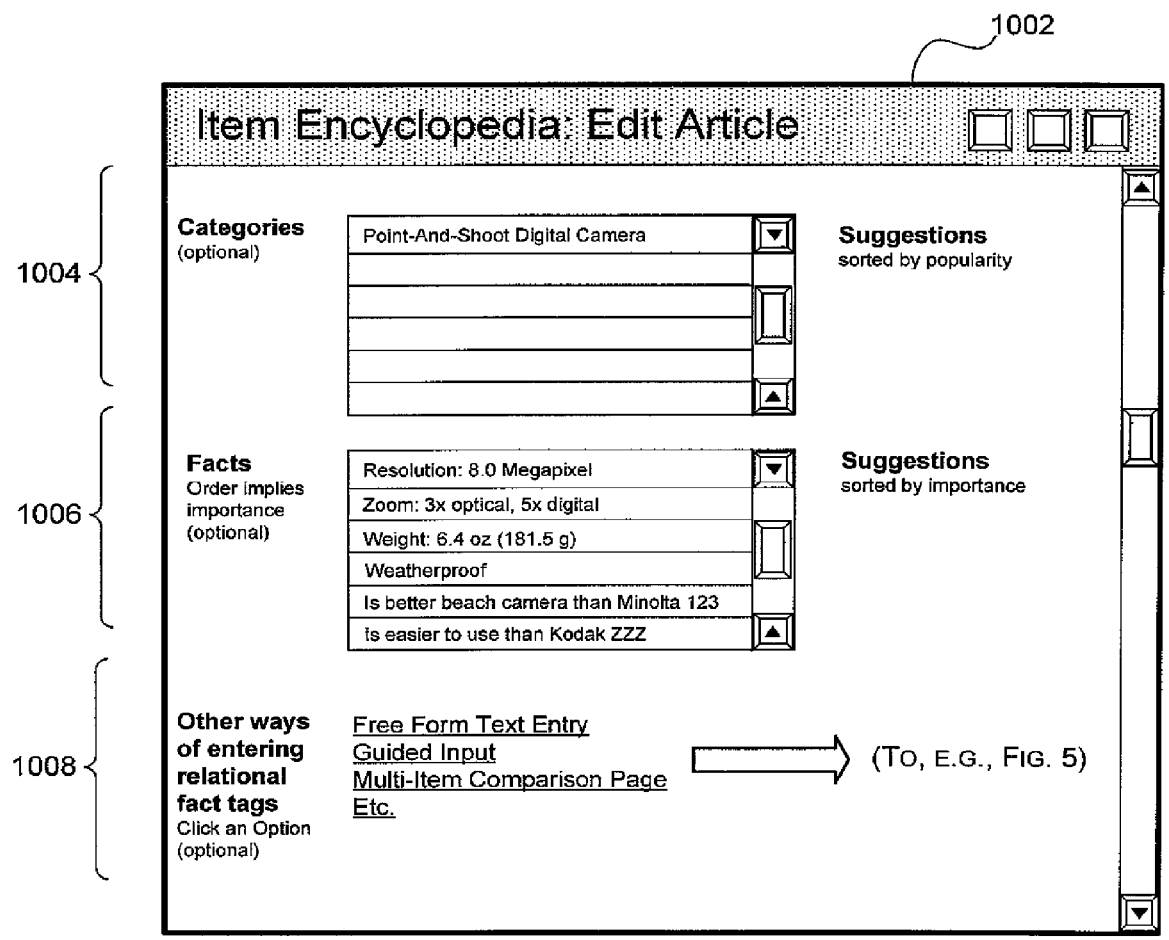
FIG. 10 shows an exemplary editing page for defining tags associated with the article page shown in FIG. 9.

The user can create and edit various aspects of the article page 902 by activating an "Edit" prompt 910. This action activates an edit page 1002 shown in FIG. 10. The edit page 1002 includes a first section 1004 for creating and editing category tags and a second section 1006 for creating and editing fact tags. In the second section 1006, the user can enter and edit non-relational types of fact tags (e.g., "Resolution: 8.0 Megapixel") that express properties of the item. The second section 1006 also allows the user to enter and edit relational types of fact tags (e.g., "Is better beach camera than Minolta 123").

The edit page 1002 can also optionally include a third section 1008 that provides special tools for creating and editing relational tags. The third section 1008 may invoke any of the editing tools shown in FIGS. 5A-5D, or yet some other type of editing mechanism.

Although not shown, other editing functionality can be used to edit portions of the article page 902 other than its tags, such as the portion of the page 902 that provides a textual description of the item.

A.7. Exemplary Processing Functionality

FIG. 11 shows exemplary processing functionality 1100 that can be used to implement various aspects of the system 400 shown in FIG. 4, such as the user device 402, the operations center 404, any component of the operations center 404, and so forth. The processing functionality 1100 can represent, without limitation, any one or more of: a personal computer; a laptop computer; a server-type computer; a book-reader type device; a portable media player device; a personal digital assistant (PDA) device; a mobile telephone device; a tablet-type input device; any kind of wearable device; a game console device; a set-top box device, and so on. To facilitate discussion, the processing functionality 1100 is described below as specifically implementing the representative user device 402, although, as stated, the generic processing functionality 1100 also sets forth an architecture of a server-type computer that can be deployed at the operations center 404.

In this local device context, the processing unit 408 can comprise one or more processing components 1102 (such as a CPU, neural network, etc.), RAM 1104, RAM 1106, media components 1108 (such as a hard drive, DVD drive, etc.), network interface 1110 (such as a telephone or cable modem, broadband connectivity mechanism, etc.), and an I/O interface 1112 for interacting with input devices and output devices. One or more buses 1114 couple the above-described components together.

The output device(s) can include the presentation unit 410, which presents the graphical user interface 414. The input device(s) 412 can include any one or more of a keyboard, mouse input device, track ball input device, joystick input device, touch sensitive screen, and so forth.

In those cases in which the processing functionality 1100 is used to implement the user device 402, the device 402's various functions can be implemented as machine-readable instructions that reside in any storage unit or combination of storage units shown in FIG. 11, and the processor 1102 can execute these instructions to produce desired operations pertaining to the creation and utilization of tags. Similarly, in those cases in which the processing functionality 1100 is used to implement the operations center 404, or some component thereof, the center 404's various functions can be implemented as machine-readable instructions that reside in any storage unit or combination of storage units shown in FIG. 11, and the processor 1102 can execute these instructions to produce desired operations pertaining to the creation and utilization of tags.

B. Exemplary Procedures

Figure 12:
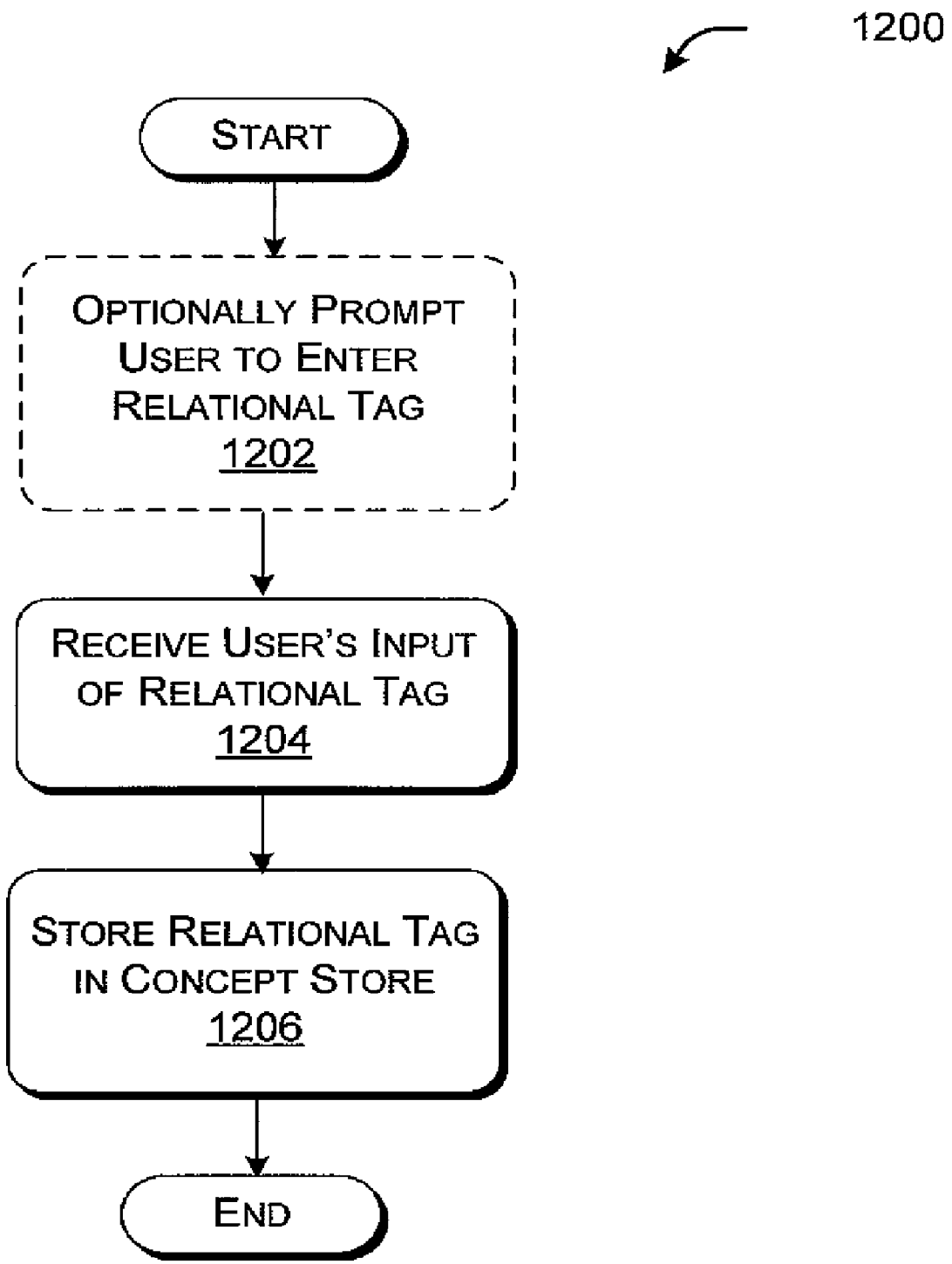
FIG. 12 shows an exemplary procedure for defining a relational tag.
Figure 13:
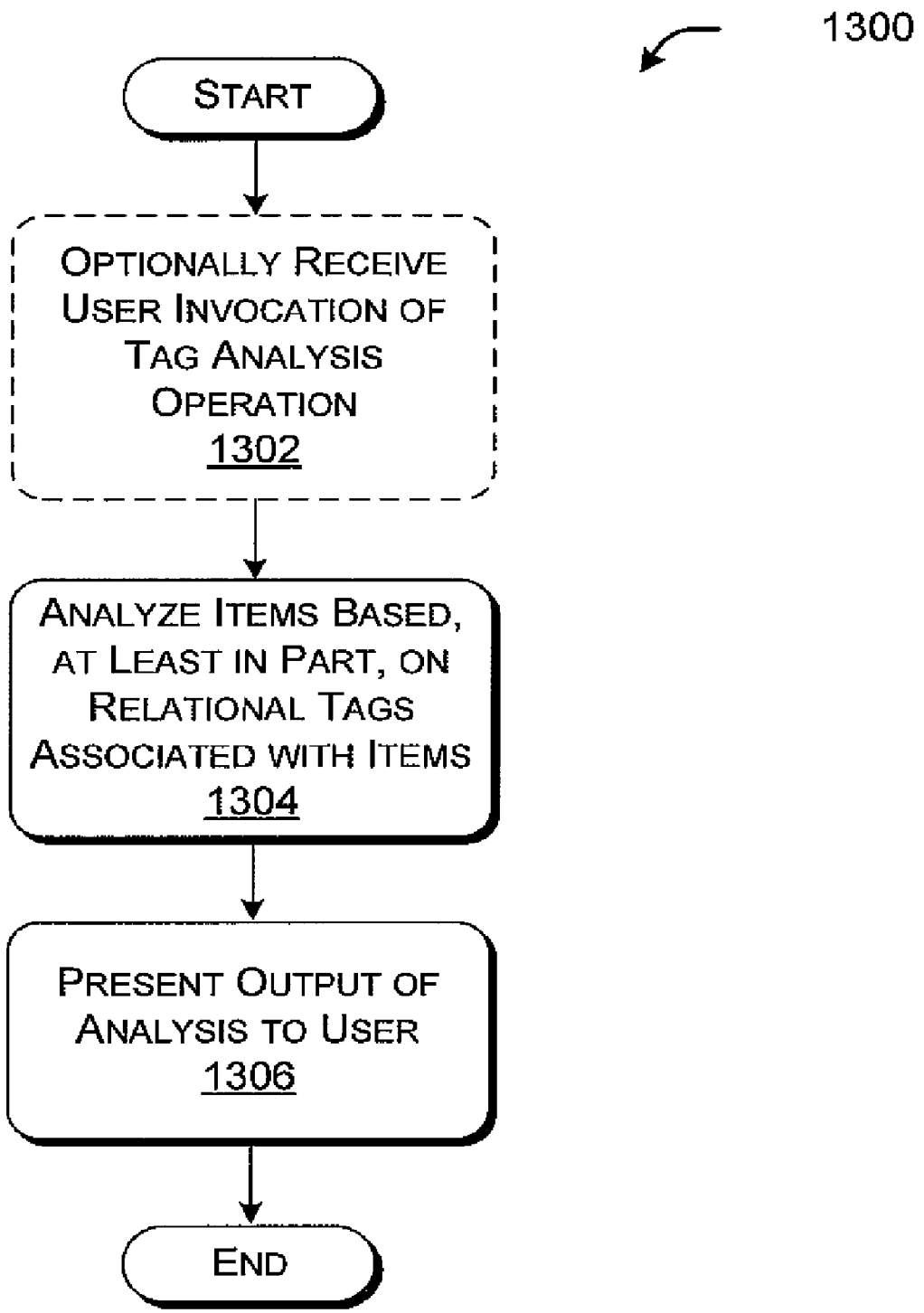
FIG. 13 shows an exemplary procedure for performing analysis based on a plurality of relational tags created using the procedure of FIG. 12.

FIGS. 12 and 13 describe the operation of the system 400 of FIG. 4 in flow chart form. To facilitate discussion, certain operations are described as constituting distinct blocks performed in a certain order. Such implementations are exemplary and non-limiting. Certain blocks described herein can be grouped together and performed in a single operation, and certain blocks can be performed in an order that differs from the order employed in the examples set forth in this disclosure. The blocks shown in the flowcharts can be implemented by software, firmware, hardware, manual processing, or by a combination of these elements.

As the functions described in the flowcharts have already been set forth in Section A, Section B serves primarily as a review of those functions.

B.1. Creation of Relational Tags

FIG. 12 shows a procedure 1200 for creating relational tags.

In block 1202, the system 400 can optionally prompt the user to enter a relational tag. For instance, when the user is viewing a particular item page for an item X, the system 400 may invite the user to specify how item X differs from another item, e.g., item Y, within an optional context C.

In block 1204, the system 400 receives the user's input of a relational tag. The user can specify a relational tag in any of the ways set forth in FIGS. 5A-5D, or in yet some other way.

In block 1206, the system 400 stores the entered relational tag in the tag store 422, or as a field in the concept object 702, as stored in the concept store 806.

B.2. Analysis of Relational Tags

FIG. 13 shows a procedure 1300 for performing analysis based on relational tags input via the procedure 1200.

In block 1302, the system 400 optionally receives the user's invocation of a tag analysis operation. For example, the user may initiate this operation by clicking on the comparison link 908 shown in FIG. 9.

In block 1304, the system 400 analyzes items based, at least in part, on the relational tags associated with the items. The system 400 can also rely on category tags and non-relational fact tags in performing cross-item comparisons.

In block 1306, the system 400 outputs the results of its analysis to the user, e.g., in the form of one or more graphical user interface presentations.

In closing, although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A computerized method comprising:
    under control of one or more computer systems configured with executable instructions,
        receiving a definition of a type of relationship represented by a relational tag, wherein the definition of the type of relationship is selected from a group consisting of:
            an accessory type of relationship representing that the base item is an accessory of the at least one other item;
            a sameness type of relationship representing that the base item is the same as the at least one other item;
            a similarity type of relationship representing that the base item is similar to the at least one other item;
            an includes type of relationship representing that the base item includes the at least one other item;
            a part type of relationship representing that the base item is a part of the at least one other item;
            a causal type of relationship representing that the base item causes the at least one other item;
            an opposite type of relationship representing that the base item is opposite of the at least one other item;

a generic type of relationship representing that the base item is a generic representation of the at least one other item;

a species type of relationship representing that the base item is a species of the at least one other item;

a substitute type of relationship representing that the base item is a substitute for the at least one other item;

a ranking relationship representing how the base item ranks with respect to the at least one other item within an identified context;

a quality type of relationship representing that the base item is better quality the at least one other item;

a cost type of relationship representing that the base item is less expensive the at least one other item;

a trend type of relationship representing that the base item is more current than the at least one other item;

a better than type of relationship representing that the base item is better than the at least one other item;

a worse than type of relationship representing that the base item is worse than the at least one other item;

a greater than (>) type of relationship representing that the base item is greater than the at least one other item;

a less than (<) type of relationship representing that the base item is less than the at least one other item;

an approximately equal (≈) type of relationship representing that the base item is approximately equal to the at least one other item; and a user created type of relationship representing that the base item has the user created type of relationship to the at least one other item;

receiving a relational tag having the type defined, the relational tag relating a base item to at least one other item according to the type of relationship defined; and annotating the base item with the relational tag.

2. The computerized method of claim 1, further comprising receiving a context in which the definition of the type of relationship relates the base item to the at least one other item, the context comprising a qualifying circumstance of the type of relationship defined in the relational tag.

3. The computerized method of claim 1, the relational tag comprising:

a name tag that identifies the type of relationship represented by the relational tag; and a value tag that expresses the at least one other item.

4. The computerized method of claim 1, further comprising establishing a graph of interconnected items by repeating the receiving the relational tag and the annotating with respect to a plurality of different base items including the base item.

5. The computerized method of claim 3, wherein at least two items in the graph are directly related.

6. The computerized method of claim 3, wherein at least two items in the graph are indirectly related through a chain of items, the chain of items comprising the at least two items in the graph and at least one intervening item.

7. A computerized method comprising:

under control of one or more computer systems configured with executable instructions, receiving a relational tag that links a base item to at least one other item according to a defined relationship, wherein the base item and the at least one other item can be acquired by a user and the defined relationship defines the link between the base item and the at least one other item, the defined relationship including a type selected from a group consisting of:

a sameness type of relationship representing that the base item is the same as the at least one other item;

an includes type of relationship representing that the base item includes the at least one other item;

a causal type of relationship representing that the base item causes the at least one other item;

a ranking relationship representing how the base item ranks with respect to the at least one other item within an identified context;

a quality type of relationship representing that the base item is better quality the at least one other item;

a cost type of relationship representing that the base item is less expensive the at least one other item;

a trend type of relationship representing that the base item is more current than the at least one other item;

a better than type of relationship representing that the base item is better than the at least one other item;

a worse than type of relationship representing that the base item is worse than the at least one other item;

a greater than (>) type of relationship representing that the base item is greater than the at least one other item;

a less than (<) type of relationship representing that the base item is less than the at least one other item;

an approximately equal (≈) type of relationship representing that the base item is approximately equal to the at least one other item; and a user created type of relationship representing that the base item has the user created type of relationship to the at least one other item; and annotating the base item with the relational tag.

8. A computerized method comprising:

under control of one or more computer systems configured with executable instructions, receiving a relational tag that links a base item to at least one other item according to a defined relationship, wherein the base item and the at least one other item can be acquired by a user and the defined relationship defines the link between the base item and the at least one other item, the defined relationship including a type selected from a plurality of types comprising:

a sameness type of relationship representing that the base item is the same as the at least one other item;

an includes type of relationship representing that the base item includes the at least one other item;

a causal type of relationship representing that the base item causes the at least one other item;

a ranking relationship representing how the base item ranks with respect to the at least one other item within an identified context;

a quality type of relationship representing that the base item is better quality the at least one other item;

a cost type of relationship representing that the base item is less expensive the at least one other item;

a trend type of relationship representing that the base item is more current than the at least one other item;

a better than type of relationship representing that the base item is better than the at least one other item;

a worse than type of relationship representing that the base item is worse than the at least one other item;

a greater than (>) type of relationship representing that the base item is greater than the at least one other item;

a less than (<) type of relationship representing that the base item is less than the at least one other item;
an approximately equal (≈) type of relationship representing that the base item is approximately equal to the at least one other item; or
a user created type of relationship representing that the base item has the user created type of relationship to the at least one other item; and
annotating the base item with the relational tag.

9. The computerized method of claim 8, wherein the defined relationship ranks the base item with respect to said at least one other item within an identified context.

10. The computerized method of claim 8, wherein the defined relationship relates the base item as a substitute for said at least one other item.

11. The computerized method of claim 8, wherein the defined relationship relates the base item as an accessory of said at least one other item.

12. The computerized method of claim 8, wherein the relational tag comprises:
a name tag that identifies a type of relationship expressed by the relational tag; and
a value tag that expresses said at least one other item.

13. The computerized method of claim 8, wherein the relational tag is stored in a data structure, the data structure also storing at least one category tag that identifies a category of the base item.

14. The computerized method of claim 8, further comprising establishing a graph of interconnected items by repeating the receiving and annotating with respect to a plurality of different base items.

15. The computerized method of claim 14, wherein at least two items in the graph are directly related.

16. The computerized method of claim 14, wherein at least two items in the graphs are indirectly related through a chain of items.

17. The computerized method of claim 14, further comprising performing comparative analysis on the graph of interconnected items.

18. The computerized method of claim 17, wherein the comparative analysis involves ranking the items in the graph of interconnected items by analyzing a plurality of relational tags, the ranking comprising an indication of a top-ranked item or bottom-ranked item in the graph.

19. The computerized method of claim 18, further comprising tagging items with category tags, wherein each category tag identifies a category of an associated item.

20. The computerized method of claim 19, wherein the comparative analysis involves providing an ordered list of items within a selected category by filtering with respect to a category tag associated with the selected category.

21. The computerized method of claim 18, further comprising analyzing collective tagging behavior of users and forming a confidence level associated with the indication of the top-ranked item or the bottom-ranked item.

22. The computerized method of claim 8, wherein the annotating is performed via a tagging system.

23. One or more machine-readable storage media storing computer-executable instructions that, when executed, cause one or more processors to perform acts comprising:
receiving a free-form relational tag, the relational tag relating a base item to at least one other item;
identifying a defined relationship between the base item and the at least one other item based at least on the free-form relational tag, wherein the defined relationship includes a type selected from a group consisting of:
a sameness type of relationship representing that the base item is the same as the at least one other item;
an includes type of relationship representing that the base item includes the at least one other item;
a causal type of relationship representing that the base item causes the at least one other item;
a ranking relationship representing how the base item ranks with respect to the at least one other item within an identified context;
a quality type of relationship representing that the base item is better quality the at least one other item;
a cost type of relationship representing that the base item is less expensive the at least one other item;
a trend type of relationship representing that the base item is more current than the at least one other item;
a better than type of relationship representing that the base item is better than the at least one other item;
a worse than type of relationship representing that the base item is worse than the at least one other item;
a greater than (>) type of relationship representing that the base item is greater than the at least one other item;
a less than (<) type of relationship representing that the base item is less than the at least one other item;
an approximately equal (≈) type of relationship representing that the base item is approximately equal to the at least one other item; and
a user created type of relationship representing that the base item has the user created type of relationship to the at least one other item; and
annotating the base item with the free-form relational tag.

24. One or more machine-readable storage media storing computer-executable instructions that, when executed, cause one or more processors to perform acts comprising:
receiving a free-form relational tag, the relational tag relating a base item to at least one other item;
identifying a defined relationship between the base item and the at least one other item based at least on the free-form relational tag, wherein the defined relationship includes a type selected from a plurality of types comprising:
a sameness type of relationship representing that the base item is the same as the at least one other item;
an includes type of relationship representing that the base item includes the at least one other item;
a causal type of relationship representing that the base item causes the at least one other item;
a ranking relationship representing how the base item ranks with respect to the at least one other item within an identified context;
a quality type of relationship representing that the base item is better quality the at least one other item;
a cost type of relationship representing that the base item is less expensive the at least one other item;
a trend type of relationship representing that the base item is more current than the at least one other item;
a better than type of relationship representing that the base item is better than the at least one other item;
a worse than type of relationship representing that the base item is worse than the at least one other item;
a greater than (>) type of relationship representing that the base item is greater than the at least one other item;
a less than (<) type of relationship representing that the base item is less than the at least one other item;

an approximately equal (≈) type of relationship representing that the base item is approximately equal to the at least one other item; or a user created type of relationship representing that the base item has the user created type of relationship to the at least one other item; and annotating the base item with the free-form relational tag.

25. The one or more machine-readable storage media of claim 24, the relational tag comprising:

a name tag that identifies the type of relationship represented by the relational tag; and a value tag that expresses the at least one other item.

26. The one or more machine-readable storage media of claim 24, wherein:

at least two items in the graph are directly related; and/or at least two items in the graph are indirectly related through a chain of items, the chain of items comprising the at least two items in the graph and at least one intervening item.

27. The one or more machine-readable storage media of claim 24, the acts further comprising receiving a context in which the definition of the type of relationship relates the base item to the at least one other item, the context comprising a qualifying circumstance of the type of relationship defined in the relational tag.

28. The one or more machine-readable storage media of claim 24, the acts further comprising establishing a graph of interconnected items by repeating the receiving the relational tag and the annotating with respect to a plurality of different base items including the base item.

29. A system comprising:

one or more processors; and one or more computer-readable storage media storing computer-executable instructions that, when executed, cause the one or more processors to perform acts comprising:

receiving a relational tag, the relational tag relating a base item to at least one other item according to a defined relationship between the base item and the at least one other item, wherein the defined relationship includes a type selected from a plurality of types comprising:

a sameness type of relationship representing that the base item is the same as the at least one other item;

an includes type of relationship representing that the base item includes the at least one other item;

a causal type of relationship representing that the base item causes the at least one other item;

a ranking relationship representing how the base item ranks with respect to the at least one other item within an identified context;

a quality type of relationship representing that the base item is better quality the at least one other item;

a cost type of relationship representing that the base item is less expensive the at least one other item;

a trend type of relationship representing that the base item is more current than the at least one other item;

a better than type of relationship representing that the base item is better than the at least one other item;

a worse than type of relationship representing that the base item is worse than the at least one other item;

a greater than (>) type of relationship representing that the base item is greater than the at least one other item;

a less than (<) type of relationship representing that the base item is less than the at least one other item;

an approximately equal (≈) type of relationship representing that the base item is approximately equal to the at least one other item; or a user created type of relationship representing that the base item has the user created type of relationship to the at least one other item; and annotating the base item with the relational tag.

30. The system as recited in claim 29, further comprising establishing a graph of interconnected items by repeating the receiving the relational tag and the annotating with respect to a plurality of different base items including the base item.

31. The system of claim 29, the relational tag comprising:

a name tag that identifies the type of relationship represented by the relational tag; and a value tag that expresses the at least one other item.

32. The system of claim 29, wherein:

at least two items in the graph are directly related; and/or at least two items in the graph are indirectly related through a chain of items, the chain of items comprising the at least two items in the graph and at least one intervening item.

33. The system of claim 29, the acts further comprising receiving a context in which the definition of the type of relationship relates the base item to the at least one other item, the context comprising a qualifying circumstance of the type of relationship defined in the relational tag.

* * * * *